US012801093B2

(12) United States Patent
Al-Irhain et al.

(10) Patent No.: US 12,801,093 B2
(45) Date of Patent: Nov. 17, 2026

(54) SMARTWATCH FOR DIRECT AND INDIRECT COMMUNICATION BETWEEN PARENT AND CHILD

(71) Applicant: IMAM ABDULRAHMAN BIN FAISAL UNIVERSITY, Dammam (SA)

(72) Inventors: Noor Saeed Al-Irhain, Dammam (SA); Hala El-Wakeel, Dammam (SA); Najla Rashid Ibrahim Alrumaihi, Dammam (SA); Ruba Mubarak Rashed Alkhaldi, Dammam (SA); Rahaf Abdulmohsin Abdullah Albaadi, Dammam (SA); Lama Alshehri, Dammam (SA); Khadijah Mohammed Nazim Ansari, Dammam (SA)

(73) Assignee: IMAM ABDULRAHMAN BIN FAISAL UNIVERSITY, Dammam (SA)

( * ) Notice: Subject to any disclaimer, the term of this patent is extended or adjusted under 35 U.S.C. 154(b) by 294 days.

(21) Appl. No.: 18/817,847

(22) Filed: Aug. 28, 2024

(65) Prior Publication Data

US 2026/0064083 A1 Mar. 5, 2026

(51) Int. Cl.
*G04G 21/02* (2010.01)
*G04G 9/00* (2006.01)
(Continued)

(52) U.S. Cl.
CPC ........... *G04G 21/025* (2013.01); *G04G 9/007* (2013.01); *G04G 17/04* (2013.01); *G04G 21/04* (2013.01); *G04C 10/00* (2013.01); *G04G 21/08* (2013.01)

(58) Field of Classification Search
CPC ...... G04G 21/025; G04G 21/04; G04G 9/007; G04G 17/04; G04G 21/08; G04C 10/00
See application file for complete search history.

(56) References Cited

U.S. PATENT DOCUMENTS 4,546,345 A * 10/1985 Naito .................... E05B 45/005 340/427
5,471,197 A * 11/1995 McCurdy ............... G08B 21/22 379/38

(Continued)

FOREIGN PATENT DOCUMENTS

CN 217089820 U 8/2022

OTHER PUBLICATIONS

"7 Alternative Ways to Charge Your Apple Watch", Wearald Team, Dec 3, 2022. 5 pages.

(Continued)

*Primary Examiner* — Sean Kayes
(74) *Attorney, Agent, or Firm* — Oblon, McClelland, Maier & Neustadt, L.L.P.

(57) ABSTRACT

A smartwatch for a child and a smartwatch communication system for facilitating communication between a parent and a child includes photoplethysmography (PPG) and electrodermal activity (EDA) sensors to measure physiological data, and a gyroscopic accelerometer to detect movement. A microprocessor analyzes this data to determine a mood and an activity level of the child. An avatar program and a video game database provide interactive, mood-modifying, and activity-promoting experiences. The smartwatch communication system includes the smartwatch and a parent's smartphone, connected via a near-field communications unit. The method involves measuring physiological and movement data, analyzing it using a measurement database, generating mood and activity messages, and transmitting this information to the parent's smartphone. This integrated approach provides comprehensive monitoring of the well-being of child, facilitates parent-child communication, and actively supports the emotional and physical health of child through engaging and age-appropriate interactions.

20 Claims, 22 Drawing Sheets

(51) Int. Cl.

| | |
|---|---|
| ***G04G 17/04*** | (2006.01) |
| ***G04G 21/04*** | (2013.01) |
| *G04C 10/00* | (2006.01) |
| *G04G 21/08* | (2010.01) |

(56) References Cited

U.S. PATENT DOCUMENTS

| | | | | |
|---|---|---|---|---|
| 5,543,780 | A * | 8/1996 | McAuley | G08B 21/0202 340/572.1 |
| 5,652,570 | A * | 7/1997 | Lepkofker | G08B 21/0283 340/8.1 |
| 6,031,460 | A * | 2/2000 | Banks | G08B 21/0288 340/538 |
| 6,263,280 | B1 * | 7/2001 | Stingone, Jr. | G01S 5/0027 701/484 |
| 6,346,886 | B1 * | 2/2002 | De La Huerga | G09F 3/005 340/5.1 |
| 2001/0055243 | A1 * | 12/2001 | Haywood | G04G 21/04 368/10 |
| 2002/0084904 | A1 * | 7/2002 | De La Huerga | G06K 19/07762 340/573.4 |
| 2002/0188210 | A1 * | 12/2002 | Aizawa | A61B 5/02433 600/502 |
| 2003/0151506 | A1 * | 8/2003 | Luccketti | G01S 19/35 340/539.13 |
| 2003/0214408 | A1 * | 11/2003 | Grajales | A61B 5/0002 600/300 |
| 2003/0218539 | A1 * | 11/2003 | Hight | G08B 21/0244 340/539.13 |
| 2020/0275844 | A1 | 9/2020 | Yuen et al. | |
| 2020/0367816 | A1 | 11/2020 | Panneer Selvam | |
| 2022/0304603 | A1 | 9/2022 | Freckleton et al. | |

OTHER PUBLICATIONS

Merlion Magnetic Band for Apple Watch Band 41mm 40mm 38mm 49mm 45mm 44mm 42mm for Women Men, Mesh Stainless Seel Dual Magnetic Clasp Strap for iWatch Series 87654321 SE Ultra, [retrieved on Sep. 14, 2023], 2 pages, retrieved from https://www.amazon.com/Merlion-Magnetic-Stainless-iWatch-Starlight/dp/B0WFC3BSQ/ref=sr 1 3?crid=1H2GT3JH0QYWR&dib=eyJ2lioiMSJ9.wLIJkdiYC4m5rX0x Y34SHULNmTYpxYBnH9VGZQrzluSpJC4VR9O6EHwOhOSxyo8y6Ts83V Tno5xmUfC6GIMeflWLCKKI4Tfi1e8uiK7mz9oluAXvZMvAHC2Wn0I7rVrUxsfOXn8Z7ncGgG2ZNJuKRTUPG93YBLU31sDayt51AtviO7uwKhGIF1 rcuMM-2iEWnWKvkAvMCbwaLTscL2OP7fn5rBOVeahSTCNU7Vys.z9mUAoQkfSh9MkY8pfuMvNQE0MwxmHot4yReFTNNIU&dibtag=se&keyworks=Merlion%2BMagnetic%2BBand%2Bfor%2BApple%2BWatch%2BBand&gid=1724851472&sprefix=merlion%2Bmagnetic%2Bband%Bfor%2Bapple%2Bband%2Caps%2C52&sr=8-38th=1.

* cited by examiner

SMARTWATCH FOR DIRECT AND INDIRECT COMMUNICATION BETWEEN PARENT AND CHILD

BACKGROUND

Technical Field

The present disclosure is directed to wearable devices, and specifically to a smartwatch designed for children for monitoring child activities and emotional states by a parent through a smartwatch interface.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, the adoption of wearable technology has grown substantially, particularly among younger users. Smartwatches have emerged as a popular category within this market, offering a range of functionalities such as fitness tracking, communication, and entertainment. These devices are increasingly being utilized by parents to monitor and stay connected with their children. Existing smartwatches include features such as GPS tracking, basic activity monitoring, and communication capabilities. These smartwatches are designed to provide convenience and safety for both children and their parents. However, current smartwatches designed for children have various limitations. Existing smartwatches often fail to comprehensively monitor the emotional states of children, limiting the ability of parents to understand and respond to needs of their child effectively. Additionally, the ease with which children can remove these devices leads to concerns about loss, tampering, and reduced effectiveness of monitoring functions. Furthermore, the lack of specialized features tailored to the unique behaviors and requirements of the children is also a significant drawback resulting in limited adoption of such devices by parents.

Various features have been proposed to address these issues, such as implementing secure wristband designs and incorporating basic sensors to monitor physical activity. Some smartwatches have introduced parental control features and applications that allow parents to track the location and the activities of their child. Despite these advancements, the effectiveness of these solutions is limited. For instance, secure wristband designs often sacrifice comfort, leading to resistance from children to wear the devices consistently. Additionally, the integration of sensors typically focuses on physical activity rather than emotional monitoring, which is required for addressing the holistic needs of children. That is, these basic sensors may not provide the detailed emotional and physiological data needed to give parents a comprehensive understanding of well-being of their child. These issues limit the ability of current smartwatches to provide a reliable and effective solution for child monitoring and emotional communication.

US20220304603A1 describes a method of monitoring an emotional state of a user including obtaining data corresponding to one or more physiological parameters of a user using one or more physiological sensors; detecting a change in at least one of the one or more physiological parameters and providing a suggested response based on the emotional state identifier. The reference describes that the wearable device can be a watch. However, this reference is not specially adapted to a child. Moreover, the wearable device does not provide games or child activities which act to change the mood of the child.

CN217089820U describes a silica gel watchband that includes a watch frame, a first band body, and a second band body. The first band body features an adjusting buckle, while the second band body has multiple jacks that correspond with the adjusting buckle, allowing for size adjustments. However, this reference does not specifically address the needs of a child's smartwatch, such as secure attachment to prevent removal, emotional state monitoring, or interactive features designed for children.

Each of the aforementioned references suffers from one or more drawbacks hindering their adoption, such as inadequate consideration for the specific needs of children. The limitations of these known solutions highlight the need for a smartwatch specifically designed to address the unique needs of children and their parents. Accordingly, it is one object of the present disclosure to provide a smartwatch for a child which aims to fulfill these requirements, incorporating attachment mechanisms to ensure secure wear, sensors to monitor both physical and emotional states, and interactive features that engage children positively, thereby providing a more effective solution for monitoring and supporting the well-being of children without compromising comfort or usability.

SUMMARY

In an exemplary embodiment, a smartwatch for a child is described. The smartwatch comprises a U-shaped body having a screen side, a base, a watch band extending edge, a watch band latching edge opposite the watch band extending edge, a button edge having a first aperture for a first button and a second aperture for a second button, a communicator edge opposite the button edge, the communicator edge having a speaker aperture and a microphone aperture; a touch screen located on the screen side; a display module located on the screen side adjacent to the touch screen; a light module located on the screen side adjacent to the display module; a speaker located within the U-shaped body beneath the display module, wherein a sound generating end of the speaker is configured to extend into the speaker aperture; a printed circuit board located within the U-shaped body, wherein the printed circuit board is configured to hold the speaker, a battery, a wireless charger, a near field communications unit, a signal booster, and a microprocessor configured with electrical circuitry, a memory and at least one processor; a photoplethysmography (PPG) sensor embedded in the base beneath the printed circuit board; an electrodermal activity (EDA) sensor embedded in the base beneath the printed circuit board; and a watch band connected to the watch band extending edge, wherein a length of the watch band is configured to fit a wrist of a child.

In another exemplary embodiment, a smartwatch communication system for facilitating communication between a parent and a child is described. The smartwatch communication system comprises a smartwatch including a photoplethysmography (PPG) sensor and an electrodermal activity (EDA) sensor configured to make PPG measurements and EDA measurements respectively on a wrist of the child, wherein the PPG measurements include blood oxygenation level and a pulse rate of the child and the EDA measurements include an electrical conductivity of the wrist of the child; a gyroscopic accelerometer located within the smartwatch, wherein the gyroscopic accelerometer is configured to measure changes in an orientation and a rotation of the smartwatch; a touch screen display located on a front face of the smartwatch; a near field communications unit located within the smartwatch; a global positioning receiver located within the smartwatch; a microprocessor operatively connected to the touch screen display, the near field communications unit, the global positioning receiver, the PPG sensor, the EDA sensor and the gyroscopic accelerometer, wherein the microprocessor is configured with electrical circuitry, a smartwatch memory including program instructions and a measurement database configured with data linking moods of the child to PPG and EDA measurements and data linking activity levels to the changes in orientation and rotation of the smartwatch, and at least one processor configured to execute the program instructions to: receive the blood oxygenation level and pulse rate of the child from the PPG sensor; receive the electrical conductivity of the wrist of the child from the EDA sensor; access the measurement database to match the PPG measurements and the EDA measurements to a mood of the child; access the measurement database to match the changes in an orientation and a rotation of the smartwatch to an activity level of the child; receive a location of the smartwatch from the global positioning receiver; generate a mood modifying message; generate an activity level message; display the mood modifying message and the activity level message on the touch screen display; and generate a communication packet including the mood, the activity level of the child and the location of the child, wherein the microprocessor is configured to command the near field communications unit to transmit the communication packet to a smartphone belonging to the parent.

In yet another exemplary embodiment, a method for smartwatch communication between a parent and a child is described. The method comprises measuring, with a photoplethysmography (PPG) sensor located within the smartwatch, a blood oxygenation level and a pulse rate of the child; measuring, with an electrodermal activity (EDA) sensor located within the smartwatch, an electrical conductivity of a wrist of the child; measuring, with a gyroscopic accelerometer located within the smartwatch, changes in an orientation and a rotation of the smartwatch; receiving, by a microprocessor located in the smartwatch, the blood oxygenation level and the pulse rate, the electrical conductivity, and the changes in the orientation and the rotation of the smartwatch; receiving, from a global positioning receiver located in the smartwatch, a location of the smartwatch, wherein the microprocessor is configured with electrical circuitry, a smartwatch memory including program instructions and at least one processor configured to execute the program instructions for: accessing a measurement database located within the smartwatch, wherein the measurement database is configured with data linking moods of the child to the blood oxygenation level and the pulse rate and with data linking activity levels to the changes in orientation and rotation of the smartwatch, to match the blood oxygenation level and the pulse rate to a mood of the child and to match the changes in orientation and rotation of the smartwatch to an activity level of the child; generating a mood modifying message; generating an activity level message; displaying, on a touch screen display of the smartwatch, the mood modifying message and the activity level message; generating a communication packet including the mood, the activity level of the child and the location of the child; transmitting, with a near field communications unit, the communication packet to a smartphone belonging to the parent.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
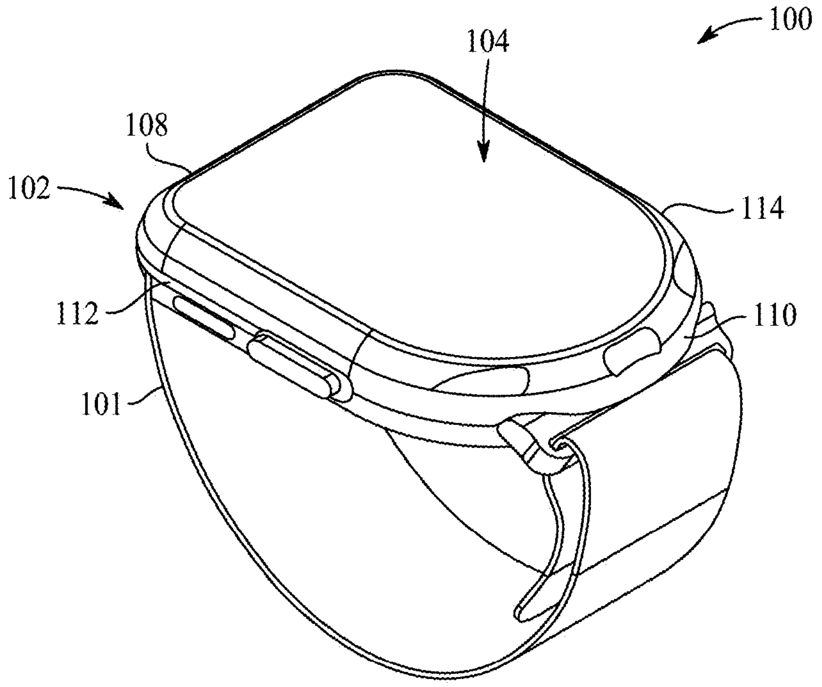
FIG. 1A is an exemplary perspective diagram of a smartwatch showing a screen side, according to certain embodiments.
Figure 1B:
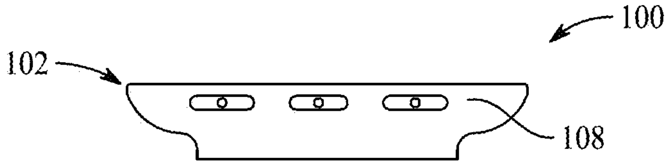
FIG. 1B is an exemplary planar diagram of the smartwatch showing a watch band extending edge, without a watch band attached thereto, according to certain embodiments.
Figure 1C:
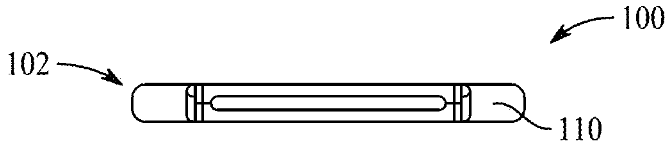
FIG. 1C is an exemplary planar diagram of the smartwatch showing a watch band latching edge, without a watch band attached thereto, according to certain embodiments.
Figure 1D:
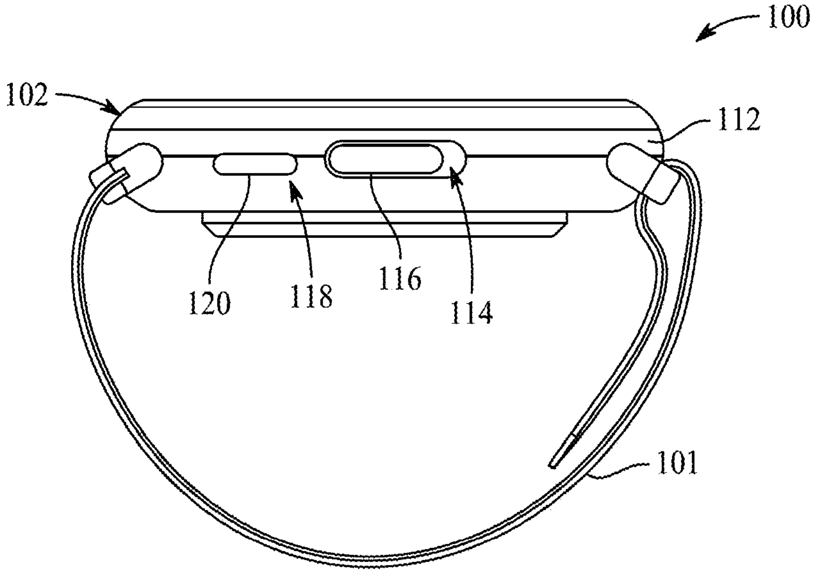
FIG. 1D is an exemplary planar diagram of the smartwatch showing a button edge, according to certain embodiments.
Figure 1E:
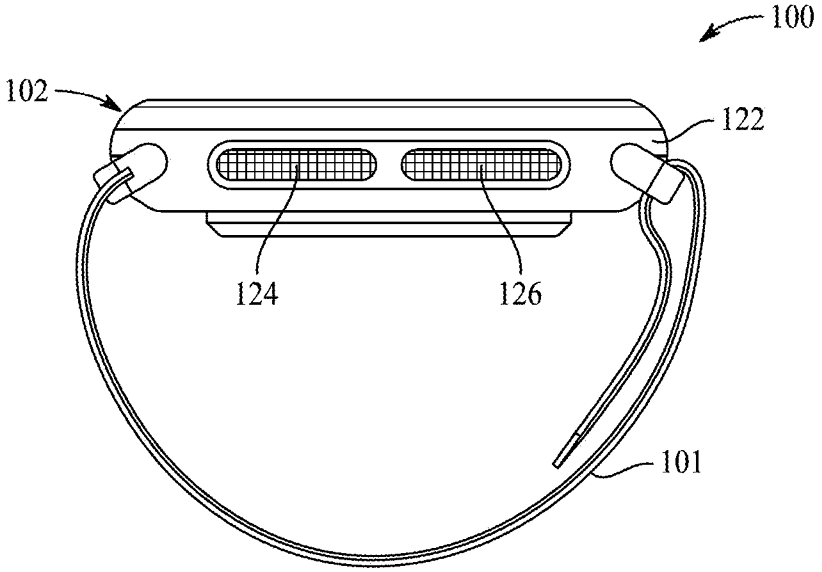
FIG. 1E is an exemplary planar diagram of the smartwatch showing a communicator edge, according to certain embodiments.
Figure 1F:
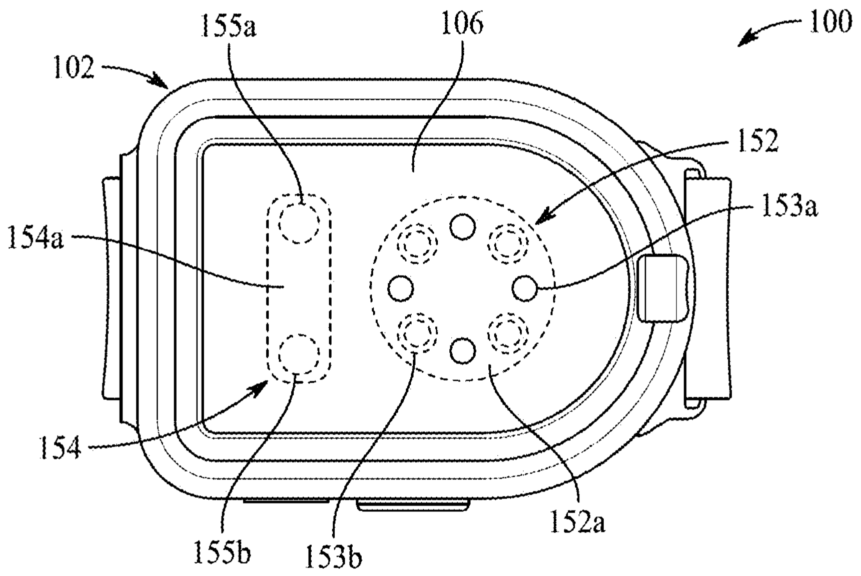
FIG. 1F is an exemplary planar diagram of the smartwatch showing a base, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a smartwatch specifically designed for children, which overcomes the drawbacks of the prior art. The smartwatch of the present disclosure provides a secure wristband attachment mechanism to prevent easy removal by the child, ensuring the device remains in place. The smartwatch also integrates sensors, such as a photoplethysmography (PPG) sensor and an electrodermal activity (EDA) sensor, to monitor emotional and physical states of the child in order to provide health data to parents through a cloud based computer application. Additionally, the smartwatch provides an intuitive user interface tailored for children, and a comprehensive system for parental control and monitoring. The smartwatch of the present disclosure addresses the unique needs of children and their parents, promoting better safety, emotional communication, and engagement.

Referring to FIGS. 1A-1G in combination, illustrated are different views of a smartwatch 100 for a child. The smartwatch 100 is a wearable electronic device designed for children. The smartwatch 100 is designed to be worn on the wrist, providing a convenient and unobtrusive way for the child to access its features. The smartwatch 100 includes various components and features to facilitate communication between the child and a parent (or guardian), monitor emotional state and activity level of the child, and provide interactive experiences. The smartwatch 100, generally, operates as a self-contained computing device, capable of executing a variety of tasks and applications. The smartwatch 100 of the present disclosure aims to empower children, enhance their connectivity, and provide parents or guardians with peace of mind.

As illustrated, the smartwatch 100 includes a U-shaped body 102 that forms the main structure of the device. The U-shaped body 102 has multiple sides and edges, each serving a specific purpose. The U-shaped body 102 has a screen side 104, and a base 106 opposite to the screen side 104. The screen side 104 is the primary interface for the child, where visual information is displayed and touch input is received. The base 106 of the U-shaped body 102 is designed to rest against wrist of the child and houses various sensors for physiological measurements. The U-shaped body 102 further includes a watch band extending edge 108, and a watch band latching edge 110 opposite to the watch band extending edge 108. The watch band extending edge 108 and the watch band latching edge 110 work together to securely attach a watch band 101 to the smartwatch 100, ensuring a comfortable and adjustable fit for the wrist of the child.

The U-shaped body 102 further includes a button edge 112, which includes a first aperture 114 for a first button 116 and a second aperture 118 for a second button 120. In the illustrated example, the first aperture 114 and the second aperture 118 are shown to be generally elliptical in shape, with the first button 116 and the second button 120 being of the complementary shape to be disposed therein; however, it may be appreciated that the apertures 114, 118 and the corresponding buttons 116, 120 may be of any other suitable shape (such as rectangular or circular) without departing from the spirit and the scope of the present disclosure. The first button 116 and the second button 120 provide physical input options for the child to interact with the smartwatch 100, such as turning the device on and off or adjusting the volume. The U-shaped body 102 also includes a communicator edge 122 opposite the button edge 112. The communicator edge 122 includes a speaker aperture 124 and a microphone aperture 126, which provide the audio communication features of the smartwatch 100. The speaker aperture 124 allows sound to be emitted from the device, while the microphone aperture 126 enables the child to input voice commands or communicate verbally with their parent.

Figure 1G:
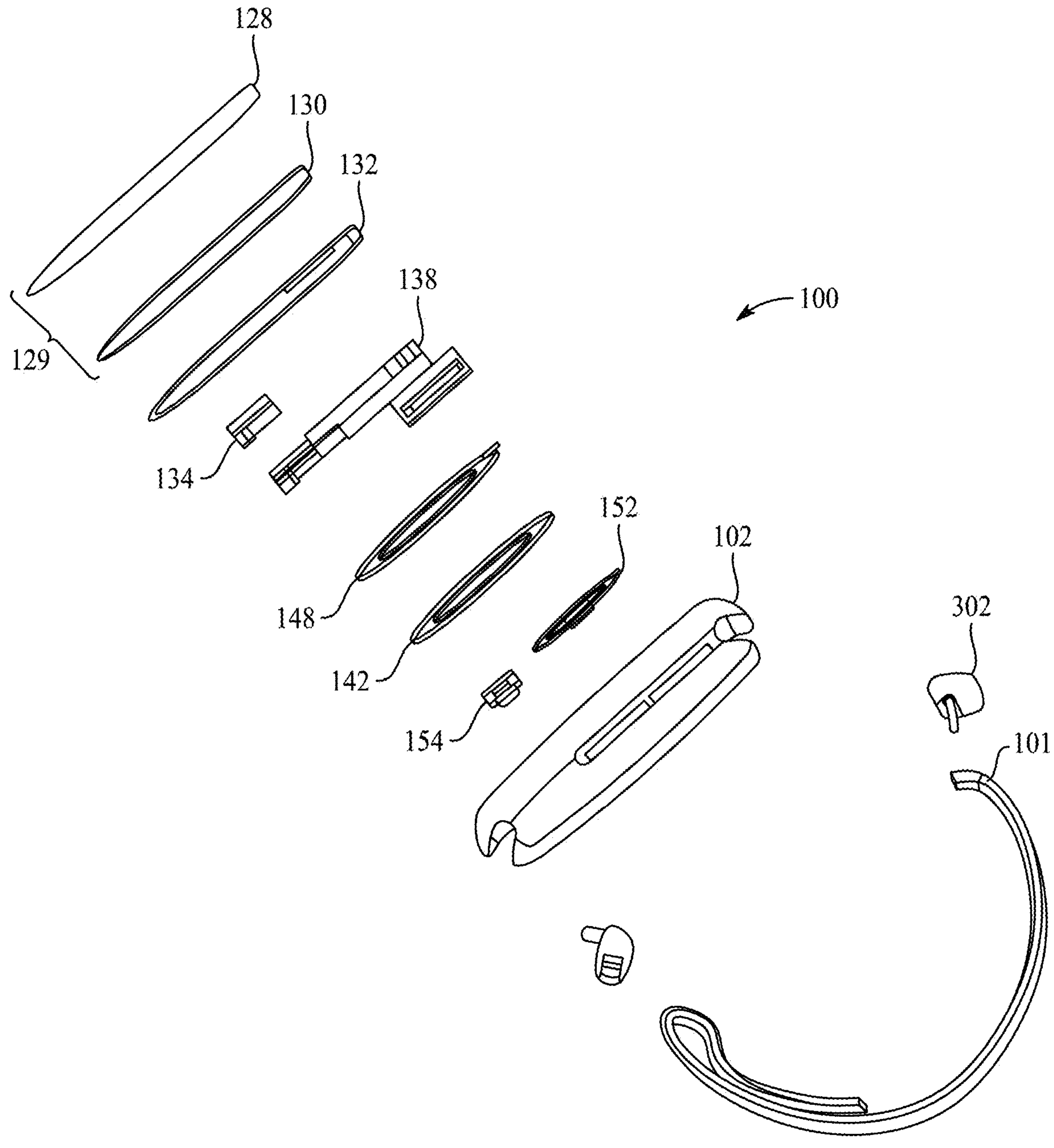
FIG. 1G is an exemplary exploded diagram of the smartwatch, according to certain embodiments.

Further, the smartwatch 100 includes a touch screen 128 located on the screen side 104 of the U-shaped body 102. The touch screen 128 allows the user to interact with the smartwatch 100 by touching or tapping on the screen. The touch screen 128 may utilize capacitive or resistive touch technology to detect touch input of the user. The touch screen 128 can be used to navigate through menus, select options, adjust settings, or trigger specific actions. The touch screen 128 may also be used to input text or other data. The smartwatch 100 also includes a display module 130 located on the screen side 104 adjacent to the touch screen 128. As may be better seen in FIG. 1G, the display module 130 is located beneath the touch screen 128. The display module 130 is responsible for presenting visual information to the user. The display module 130 may be of various types, such as LCD (Liquid Crystal Display) or OLED (organic light emitting diode). The display module 130 may present a variety of information, including the time, date, notifications, messages, app icons, and other relevant data. The display module 130 may also display visual elements for games, educational content, or other interactive features, as discussed later in the description in more detail. The display module 130 works in conjunction with the touch screen 128 to create an interactive and engaging user experience. Hereinafter, the touch screen 128 and the display module 130 together have sometimes been referred to as touch screen display 129 (as represented in FIG. 1G), without any limitations.

Furthermore, the smartwatch 100 includes a light module 132 located on the screen side 104 adjacent to the display module 130. The light module 132 is configured to illuminate the display module 130 by providing backlighting, to enhance visibility in low-light conditions. The light module 132 may be controlled to adjust the brightness or intensity of the illumination based on ambient light conditions or user preferences. The light module 132 may also be used to create visual alerts or notifications for the child. The light module 132 may include one or more light-emitting diodes (LEDs) or other light sources. The smartwatch 100 also includes a speaker 134 and a microphone 136 located within the U-shaped body 102 beneath the display module 130. The speaker 134 is configured to produce audio output, such as ringtones, notifications, music, or voice prompts. The microphone 136 is configured to receive audio input, such as voice commands or ambient sounds. A sound-generating end of the speaker 134 is configured to extend into the speaker aperture 124 on the communicator edge 122, and a sound-receiving end of the microphone 136 is configured to extend into the microphone aperture 126 on the communicator edge 122. In the present configuration, the speaker 134 may be a piezoelectric transducer or the like, and the microphone 136 may be an electret condenser microphone or the like without any limitations.

Figure 1H:
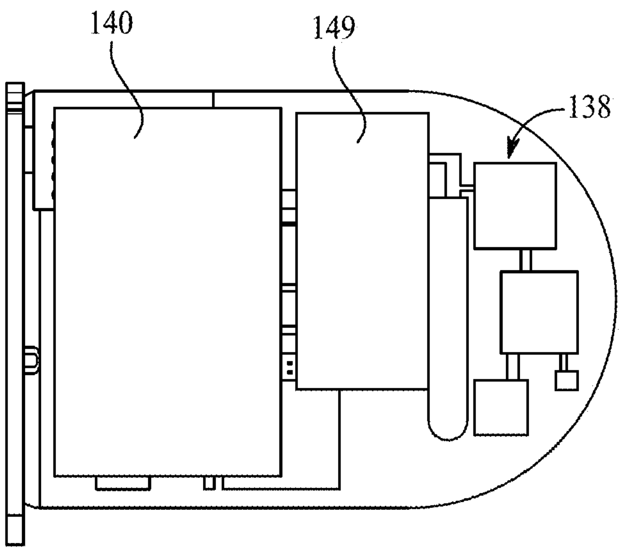
FIG. 1H is an exemplary planar diagram of the base from the screen side, showing internal components including a printed circuit board of the smartwatch, according to certain embodiments.
Figure 1I:
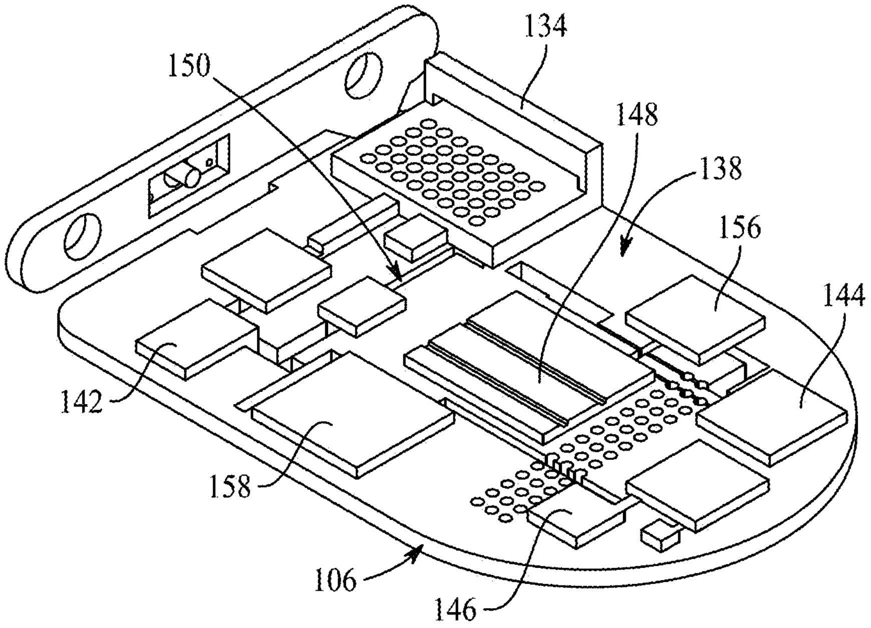
FIG. 1I is an exemplary perspective diagram of the base from the screen side, showing the internal components of the smartwatch with a battery and a haptic engine removed therefrom, according to certain embodiments.

The smartwatch 100 further includes a printed circuit board (PCB) 138 located within the U-shaped body 102. The PCB 138 serves as the main platform for mounting and interconnecting the electronic components of the smartwatch 100. The PCB 138 may be a rigid or flexible PCB, depending on the design and form factor of the smartwatch 100. The PCB 138 may be made of various materials, such as fiberglass or polyimide, and may have multiple layers to accommodate the circuitry of the smartwatch 100. As illustrated in FIGS. 1H and 1I, the PCB 138 is configured to hold various components, including the speaker 134, a battery 140, a wireless charger 142, a near field communications (NFC) unit 144, a signal booster 146, and a microprocessor 148. The battery 140 provides power to the smartwatch 100, and the wireless charger 142 allows the battery 140 to be charged wirelessly. The NFC unit 144 enables short-range wireless communication with other NFC-enabled devices, such as smartphones or payment terminals. The signal booster 146 amplifies the cellular or Wi-Fi signals received by the smartwatch 100 to improve connectivity. The smartwatch 100 may also include a taptic engine 149 that provides haptic feedback to the child. The taptic engine 149 may be used to vibrate the smartwatch 100 to get attention of the child or to provide feedback during games and activities.

The microprocessor 148 is an integrated circuit that contains a central processing unit (CPU), memory, and other components. The microprocessor 148 is responsible for executing instructions, performing calculations, and controlling the overall operation of the smartwatch 100. The microprocessor 148 may be a low-power microprocessor designed for wearable devices. The microprocessor 148 is configured with electrical circuitry, a memory, and at least one processor. The electrical circuitry includes various components, such as resistors, capacitors, inductors, and transistors, that are interconnected to form functional circuits. The memory stores data and instructions that are used by the processor. The processor executes the instructions to perform various tasks, such as controlling the display, processing sensor data, and communicating with other devices. More details about the microprocessor 148 are discussed later in the description in reference to FIGS. 13-16.

The smartwatch 100 further includes a photoplethysmography (PPG) sensor 152 embedded in the base 106 beneath the printed circuit board 138. The PPG sensor 152 is a type of optical sensor that uses light to measure changes in blood volume in the wrist of the child. These measurements can be used to calculate heart rate of the child, blood oxygen saturation, and other physiological parameters. The smartwatch 100 also includes an electrodermal activity (EDA) sensor 154 embedded in the base 106 beneath the printed circuit board 138. The EDA sensor 154 measures the electrical conductance of skin of the child, which can vary depending on the emotional state of the child. The EDA measurements can be used to infer emotional state of the child, such as stress, excitement, or relaxation.

Also, as illustrated in FIGS. 1H and 1I, the smartwatch 100 includes a wiring harness 150 located within the PCB 138. The wiring harness 150 is a network of wires or conductive traces that establishes electrical connections between various components of the smartwatch 100. The wiring harness 150 is configured to connect the microprocessor 148 to the battery 140, the wireless charger 142, the near field communications unit 144, the signal booster 146, the memory, the speaker 134, the microphone 136, the display module 130, the light module 132, the touch screen 128, the PPG sensor 152, and the EDA sensor 154. The wiring harness 150 facilitates the flow of electrical signals and power between these components, enabling them to communicate and function together as an integrated system.

Figure 1J:
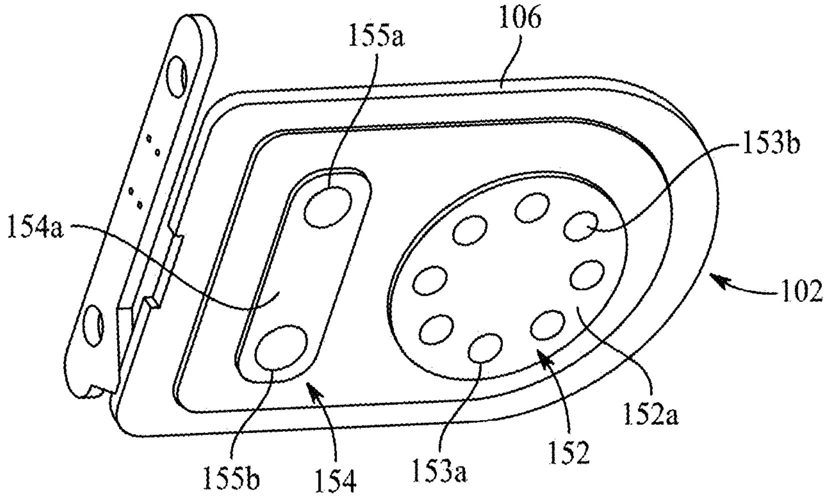
FIG. 1J is an exemplary perspective diagram of the base showing a photoplethysmography (PPG) sensor and an electrodermal activity (EDA) sensor embedded therein, according to certain embodiments.

Further, as illustrated in FIG. 1J, the smartwatch 100 includes a PPG measurement surface **152*a* located on a side of the PPG sensor 152. The PPG measurement surface 152*a* is the part of the PPG sensor 152 that comes into contact with the skin of the child. The PPG measurement surface 152*a* is flush with an outside surface of the U-shaped body 102. That is, the PPG measurement surface 152*a* does not protrude from the body 102 and creates a smooth surface for comfortable wear. The PPG measurement surface 152*a* includes a plurality of high-intensity infrared light-emitting diodes (LEDs) 153*a* and a plurality of photodiodes 153*b*. The high-intensity infrared LEDs 153*a* emit infrared light into the wrist of the child. The photodiodes 153*b* measure the amount of infrared light that is reflected back from the wrist of the child. The microprocessor 148 generates PPG measurement commands that control the timing and intensity of the infrared light emitted by the LEDs 153*a*. The photodiodes 153*b* measure the reflected infrared light and convert it into electrical signals. These electrical signals are then processed to determine blood oxygenation level and pulse rate of the child. The PPG sensor 152 then transmits the blood oxygenation level and the pulse rate through the wiring harness 150 to the microprocessor 148** for further analysis and processing.

The smartwatch 100 also includes an EDA measurement surface 154*a* located on a side of the EDA sensor 154. The EDA measurement surface 154*a* is the part of the EDA sensor 154 that comes into contact with the skin of the child. The EDA measurement surface 154*a* is flush with an outside surface of the U-shaped body 102. That is, the EDA measurement surface 154*a* does not protrude from the body 102 and creates a smooth surface for comfortable wear. The EDA measurement surface 154*a* includes a sense electrode 155*a* and a counter electrode 155*b*. The sense electrode 155*a* is located at a first end of the EDA measurement surface 154*a*, and the counter electrode 155*b* is located at a second end, separated from the first end by a distance less than the length of the EDA sensor 154. The microprocessor 148 generates EDA measurement commands that actuate the sense electrode 155*a* to generate a small electrical current. The EDA sensor 154 measures the voltage between the sense electrode 155*a* and the counter electrode 155*b*, which is proportional to the electrical conductivity of the skin of the child. The EDA sensor 154 then transmits the electrical conductivity measurement through the wiring harness 150 to the microprocessor 148 for further analysis and processing.

Further, as illustrated in FIG. 1I, the smartwatch 100 includes a gyroscopic accelerometer 156 located on the printed circuit board 138 and connected to the microprocessor 148 through the wiring harness 150. The gyroscopic accelerometer 156 is a type of sensor that measures changes in the orientation and rotation of the smartwatch 100. This information can be used to track movements and activity levels of the child. The gyroscopic accelerometer 156 may include a microelectromechanical system (MEMS) device that measures the angular velocity and acceleration of the smartwatch 100. The gyroscopic accelerometer 156 transmits the changes in orientation and rotation through the wiring harness 150 to the microprocessor 148 for further analysis and processing. The smartwatch 100 further includes a global positioning receiver 158 located within the smartwatch 100. The global positioning receiver 158 is a device that receives signals from GPS satellites to determine the location of the smartwatch 100, and thereby track location of the child. The global positioning receiver 158 may include an antenna, a receiver, and a processor. The antenna receives signals from GPS satellites, the receiver decodes the signals, and the processor calculates the location of the smartwatch 100. The global positioning receiver 158 transmits the location information through the wiring harness 150 to the microprocessor 148 for further analysis and processing.

Figure 2:
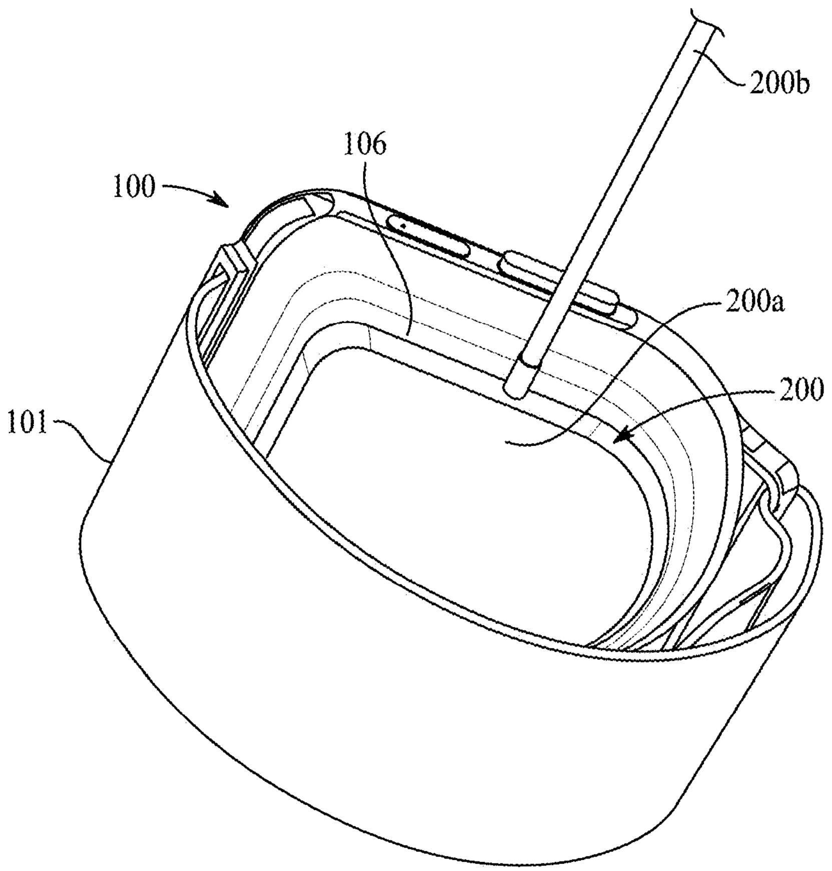
FIG. 2 is an exemplary perspective diagram of the smartwatch with a battery charger attached thereto, according to certain embodiments.

Referring to FIG. 2, as illustrated, the smartwatch 100 further includes a battery charger 200, which is used to recharge the battery 140. The battery charger 200 has a charge end 200*a* configured to attach magnetically to the base 106 of the smartwatch 100. As depicted, the charge end 200*a* is in the form of a puck to be attached to the base 106 of the smartwatch 100. This magnetic attachment ensures a secure connection between the battery charger 200 and the smartwatch 100 during charging. The battery charger 200 also has a transformer end 200*b* (generally represented in FIG. 2) that is configured to connect to a power source (not shown), such as a wall outlet or a USB port. When the base 106 of the smartwatch 100 is attached to the charge end 200*a* of the battery charger 200, the battery charger 200 transfers electrical energy to the battery 140, thereby charging it. The magnetic attachment mechanism of the battery charger 200 provides a convenient and user-friendly way to charge the smartwatch 100.

In an aspect of the present disclosure, the first button 116 is an ON/OFF button (also referred to as "ON/OFF button 116"). The ON/OFF button 116 is located in the first aperture 114 on the button edge 112 of the U-shaped body 102. The ON/OFF button 116 is configured to turn the smartwatch 100 on or off. The ON/OFF button 116 is connected to the microprocessor 148 through the wiring harness 150. When the ON/OFF button 116 is depressed, it sends a signal to the microprocessor 148, which then executes the appropriate instructions to either turn on or turn off the smartwatch 100. Further, the second button 120 is a volume control button (also referred to as "volume control button 120"). The volume control button 120 is located in the second aperture 118 on the button edge 112 of the U-shaped body 102. The volume control button 120 is configured to adjust the volume of the speaker 134. The volume control button is connected to the speaker 134, through the wiring harness 150. When the volume control button 120 is depressed, it sends a signal to the speaker 134, which then adjusts the volume of the audio output of the smartwatch 100 accordingly.

Figure 3A:
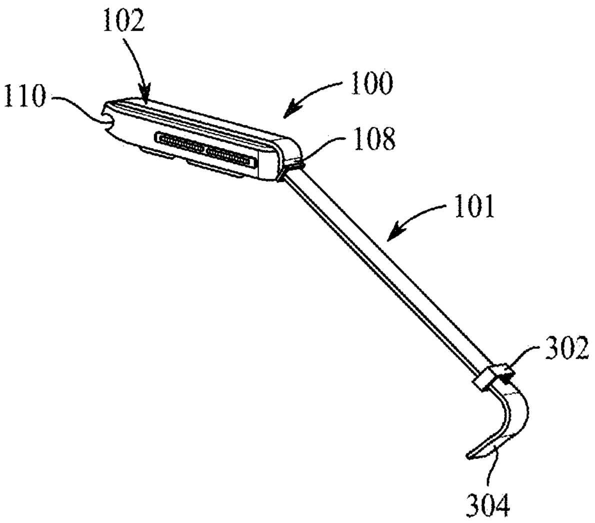
FIG. 3A depicts a first stage involved in wearing of the smartwatch on a wrist of a user, according to certain embodiments.
Figure 3B:
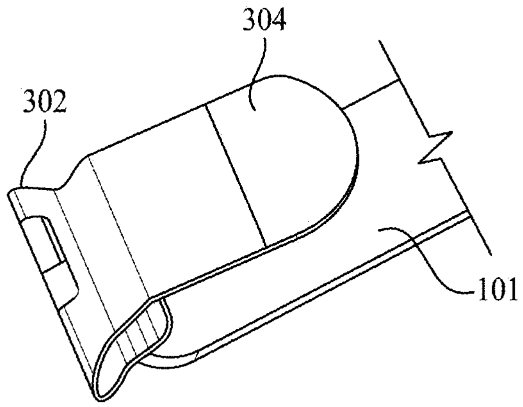
FIG. 3B depicts a second stage involved in wearing of the smartwatch on the wrist of the user, according to certain embodiments.
Figure 3C:
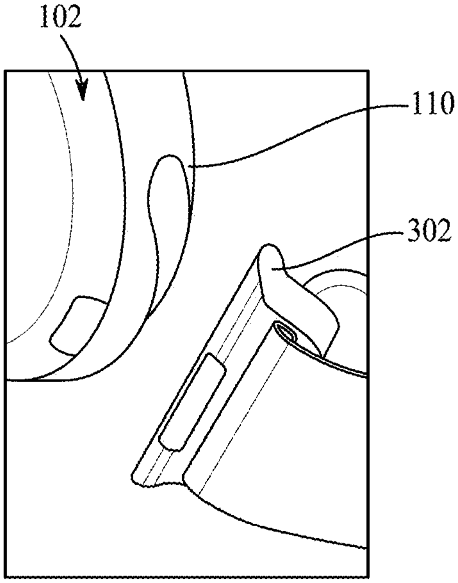
FIG. 3C depicts a third stage involved in wearing of the smartwatch on the wrist of the user, according to certain embodiments.
Figure 3D:
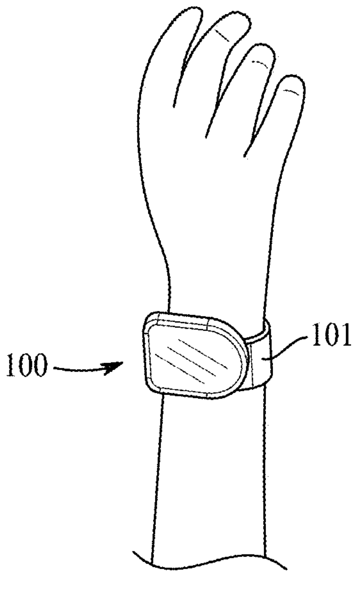
FIG. 3D depicts the smartwatch being worn on the wrist of the user, according to certain embodiments.

Further, as discussed, the smartwatch 100 includes the watch band 101. The watch band 101 is connected to the watch band extending edge 108 of the U-shaped body 102. The watch band 101 is designed to securely fasten the smartwatch 100 to the wrist of a child. The length of the watch band 101 is adjustable to accommodate different wrist sizes, ensuring a comfortable and secure fit for the child. Referring to FIGS. 3A-3D, the watch band 101 is attached to the smartwatch 100 through a series of steps. Herein, the watch band 101 is first attached at a first end to the watch band extending edge 108 of the smartwatch 100. The watch band 101 includes a throw element 302 (also shown in FIG. 1G) which can be moved along a length of the watch band 101. The watch band 101 also includes a magnetic element 304 at a second end. The throw element 302 can be moved to appropriate position and the second end can be looped around such that the magnetic element 304 can be coupled to desired position on the length of the watch band 101 (due to being magnetic itself). Then, the throw element 302 can be coupled with the watch band latching edge 110, securely attaching the watch band 101 from both ends. This configuration provides that the watch band 101 be adjusted to achieve a comfortable and secure fit on the wrist of the child by moving the throw element 302 along the length of the watch band 101. In FIG. 3D, the smartwatch 100 is shown fully worn on the wrist of the child, with the watch band 101 securely fastened.

In a preferred embodiment of the invention, the watchband 101 includes one or more embedded wires that are electrically connected to the printed circuit board 138 through a contact point on the outside surface of the U-shaped body 102 at the watchband extending edge 108. The conductive wires extend internally in the watchband 101 and extend towards the watchband latching edge 108 of the U-shaped body 102 along a length of 0.1 to 0.9 times the length of the watch band, or preferably a distance of 5-50 mm, 10-40 mm or 20-30 mm from the extending edge. The wires extend along a length of the watchband 101 and terminate at or emerge in one or more separated pillars, e.g., protrusions, that extend from a surface of an interior surface of the watchband on the wrist facing side of the watchband. Each pillar has a height of 0.5-5 mm, preferably from 1 to 2 mm. The pillars are preferably in the form of cylindrical extensions having a diameter of 0.5-3 mm, preferably about 2 mm. The end of the pillar distal from the interior surface of the watchband is preferably capped with a hemispherically shaped portion that has a height of 0.1-0.5 times the height of the pillar, and a circumference that is 2-3 times the circumference or widest diameter of the pillar. A haptic device is disposed either at the base of the pillar proximal to the interior surface of the watchband and connected to a haptic device disposed in the watch band and/or at the external surface thereof, or, in an alternate embodiment, the wire extends through a conductive path upwards through the pillar to a haptic device embedded in the hemispherical cap. The pillar-cap structure has a mushroom-like appearance. The purpose of these protrusions or extensions on the interior surface of the watchband is to provide improved haptic stimulation to a child's wrist in comparison to a haptic device disposed only on a flat interior surface of the U-shaped body. The haptic devices are configured to provide vibrational signals at locations along the watchband. In an example, a first pillar having a haptic device located at the watch band extending edge 108, a second pillar having a haptic device located about 1 cm from the first pillar and a third pillar having a haptic device located at the watch band latching edge 110 are used to direct a child to move to the left, the right or the center of a video game showing on the screen. In another example, the first pillar having a haptic device located at the watch band extending edge 108, the second pillar having a haptic device located about 1 cm from the first pillar and the third pillar having a haptic device located at the watch band latching edge 110 are used to vibrate to let a child know whether a female parent, a sibling or a male parent respectively is calling. In a third example, the first pillar having a haptic device located at the watch band extending edge 108, the second pillar having a haptic device located about 1 cm from the first pillar and the third pillar having a haptic device located at the watch band latching edge 110 are used to vibrate to notify the child of a start, continue and stop time respectively of an activity exercise. In a fourth example, the plurality of pillars configured with haptic devices may be used to provide stimulation along the nerves of the wrist of the child in time with the biorhythms of the child to calm the child. In a fifth example, the plurality of pillars configured with haptic devices may be used to signal a successful completion of an activity or game by vibrating all at once. In a sixth example, the plurality of pillars configured with haptic devices may be used to signal completion of a level of an activity or game by vibrating at the first pillar, the second pillar or the third pillar. The plurality of pillars configured with haptic devices may be used to provide additional signalling between the smartwatch and the child and their function is not limited to the examples given above. Furthermore, the plurality of pillars configured with haptic engines is not limited to three and may be limited only by size constraints of the watch band.

Figure 8:
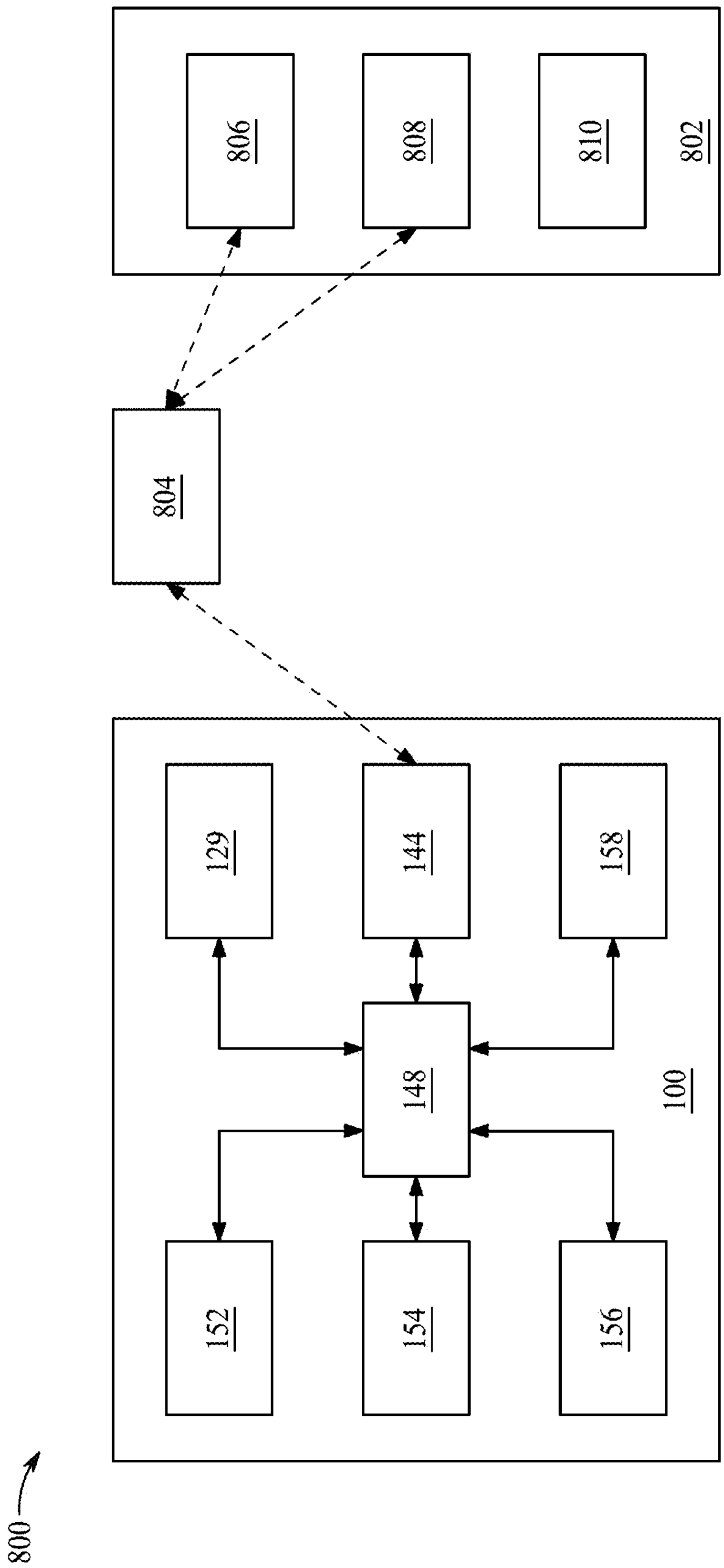
FIG. 8 is an exemplary schematic diagram of a smartwatch communication system, according to certain embodiments.

In an aspect of the present disclosure, the smartwatch 100 further includes a measurement database (not shown in the drawings) stored within the memory of the microprocessor 148. The measurement database is configured with data linking moods of the child to PPG and EDA measurements. That is, the measurement database contains data that correlates various physiological measurements, such as blood oxygenation level, pulse rate, and electrical conductivity of the skin, with different moods of the child. In the smartwatch 100, as shown in FIG. 8, the microprocessor 148 receives the blood oxygenation level and pulse rate from the PPG sensor 152 and the electrical conductivity from the EDA sensor 154. The microprocessor 148 then accesses the measurement database to compare these measurements with the stored data and determine current mood of the child. Based on the identified mood, the microprocessor 148 generates a mood-modifying message, which is a message or notification intended to help the child regulate their emotions or improve their mood. The mood-modifying message may be presented in the form of text, images, animations, or a combination of these elements. The purpose of displaying the mood-modifying message is to provide the child with feedback and guidance on how to manage their emotions effectively. The microprocessor 148 also generates a mood communication packet, which is a data packet containing information about mood of the child. Further, the NFC unit 144 of the smartwatch 100 is configured to transmit the mood communication packet generated by the microprocessor 148. The mood communication packet may be transmitted to a paired device, such as a smartphone or tablet, belonging to the parent or guardian of the child. The paired device may have an application or software that can receive and interpret the mood communication packet. This allows the parent or guardian to monitor the emotional state of the child remotely and provide appropriate support or intervention if needed.

In an aspect of the present disclosure, the smartwatch 100 further includes data records (not shown in the drawings) located in the measurement database which link the orientation and rotation data from the gyroscopic accelerometer 156 to activity levels of the child. The microprocessor 148 continuously monitors the data received from the gyroscopic accelerometer 156 and compares it with the stored data records to determine the current activity level of the child. Based on this analysis, the microprocessor 148 generates an activity message. The activity message is a notification or alert related to the activity level of the child. For example, the activity message may indicate that the child has been inactive for a certain period. The display module 130 of the smartwatch 100 is configured to display the activity message generated by the microprocessor 148. The activity message may be presented in various formats, such as text, icons, or graphical representations. The purpose of displaying the activity message is to provide the child or their parent/guardian with feedback on the activity levels of the child, promoting an active lifestyle. Further, the NFC unit 144 of the smartwatch 100 is configured to transmit the activity levels and movement activity message in an activity communication packet. This packet is sent to a paired device, such as a smartphone or tablet, belonging to the parent or guardian of the child. The paired device may have an application or software that can receive and interpret the activity communication packet, allowing the parent or guardian to monitor the activity levels of the child remotely and encourage them to maintain an active lifestyle.

In some aspects, the microprocessor 148 is configured to monitor the activity levels in time intervals of about 30 minutes. That is, the microprocessor 148 is programmed to regularly monitor activity levels of the child at predetermined time intervals, specifically approximately every 30 minutes. This monitoring process involves analyzing the data received from the gyroscopic accelerometer 156, which measures changes in orientation and rotation of the smartwatch 100. The microprocessor 148 is further configured to generate the movement activity message when the activity level of the child does not change within the time interval. That is, if the microprocessor 148 detects that the activity level of the child has remained unchanged within a given 30-minute interval, it triggers the generation of a movement activity message. This message serves as a reminder or prompt for the child to engage in physical activity, promoting an active lifestyle.

The smartwatch 100 further includes a video game database stored within the memory of the microprocessor 148. The video game database contains a collection of video games specifically designed to modify mood and promote physical activity. The mood-modifying video games are tailored to address different emotional states, such as anxiety, boredom, or sadness, and aim to improve mood of the child through interactive elements. The activity video games, on the other hand, are designed to encourage physical movement and exercise, promoting an active lifestyle. In addition to the video game database, the smartwatch 100 also includes an avatar program stored within the memory of the microprocessor 148. The avatar program allows the child to interact with a virtual character or avatar. In the present examples, the avatar is a "Positive Parenting" character. The at least one processor of the microprocessor 148 is configured to execute the program instructions of the avatar program based on the mood or activity level of the child. In one scenario, the microprocessor 148 is configured to access a mood modifying video game based on the mood of the child and display the avatar on the display module 130 with instructions to click on the avatar to play the mood modifying video game. That is, if the mood of the child is identified as needing improvement, the microprocessor 148 accesses the video game database and selects the mood-modifying video game that is appropriate for the current emotional state of the child. The microprocessor 148 then displays the avatar on the display module 130, along with instructions for the child to click on the avatar to start playing the selected mood-modifying video game. In another scenario, the microprocessor 148 is configured to access an activity video game based on the activity level of the child and display the avatar on the display module 130 with instructions to click on the avatar to play the activity video game. That is, if the activity level of the child is determined to be low, the microprocessor 148 accesses the video game database and selects the activity video game to encourage physical movement. The avatar is again displayed on the display module 130, prompting the child to click on it and start playing the activity video game.

Figure 4:
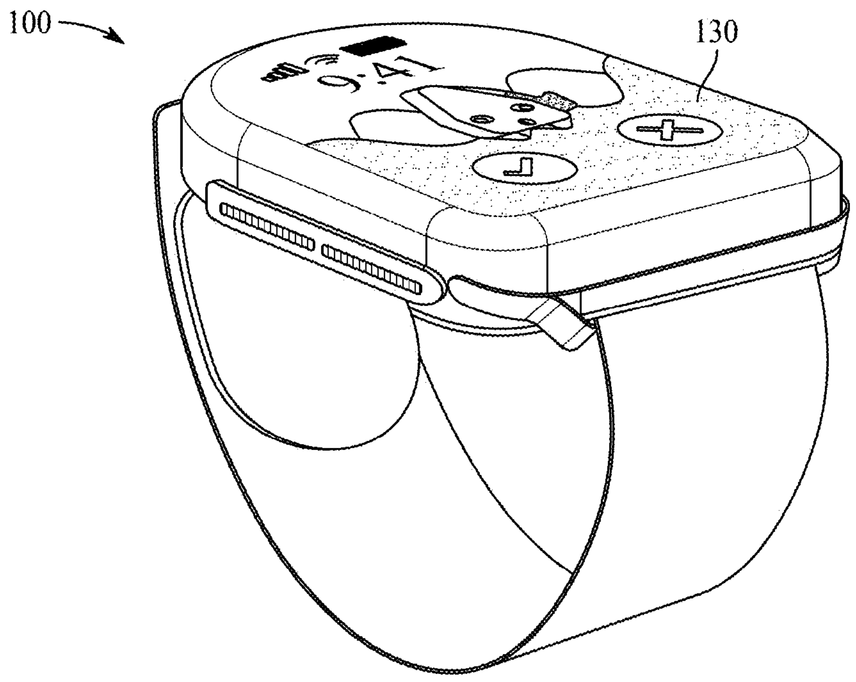
FIG. 4 depicts the smartwatch being utilized for implementing an avatar program, according to certain embodiments.
Figure 5A:
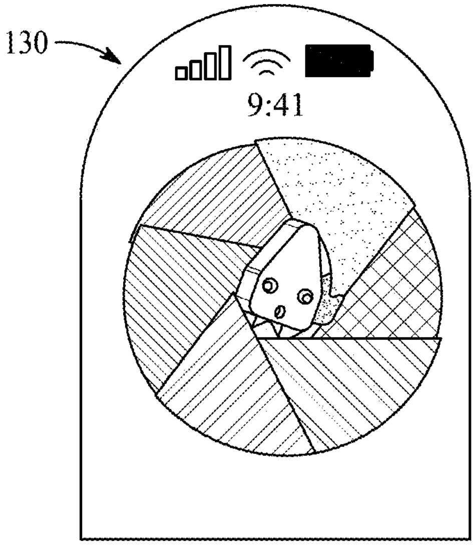
FIG. 5A depicts an exemplary first interface of implementation of the avatar program, according to certain embodiments.
Figure 5B:
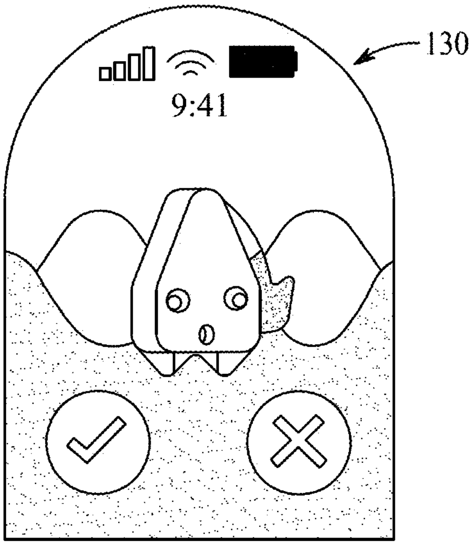
FIG. 5B depicts an exemplary second interface of implementation of the avatar program, according to certain embodiments.

Referring to FIG. 4, illustrated is a depiction of the smartwatch 100 with the display module 130 providing an interface for displaying different messages. In particular, the smartwatch 100 implements the avatar program, with the avatar being a "Positive Parenting" character. Referring to FIG. 5A and FIG. 5B, illustrated are exemplary interfaces of the implementation of the avatar program on the display module 130 of the smartwatch 100. In FIG. 5A, the display module 130 shows a circular interface element divided into multiple-colored segments. At the center of the circular interface element is the avatar (represented as a teardrop-shaped character). The microprocessor 148 is configured to animate this interface, allowing the circular segments to open and close around the avatar. This dynamic visual element serves to capture attention of the child and maintain their interest in interacting with the smartwatch 100. FIG. 5B depicts another interface where the avatar program is implemented to help manage the emotional state of the child, particularly in situations where the child may be experiencing feelings of anger or frustration. Below the avatar are two interactive buttons, a checkmark and a cross. The microprocessor 148 is programmed to present the child with choices or suggested activities through the avatar. The child can then use these buttons to accept (checkmark) or decline (cross) the proposed activity. This interactive approach, facilitated by the avatar program, allows the smartwatch 100 to actively assist in managing the emotional state of the child.

Figure 6A:
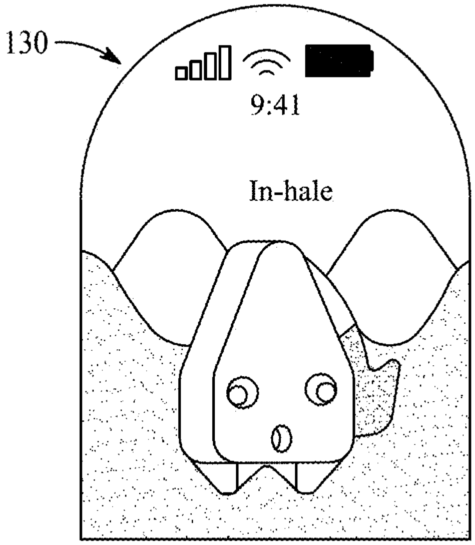
FIG. 6A depicts an exemplary first interface of implementation of the avatar program for executing mood modifying breathing exercises guiding a child to inhale, according to certain embodiments.
Figure 6B:
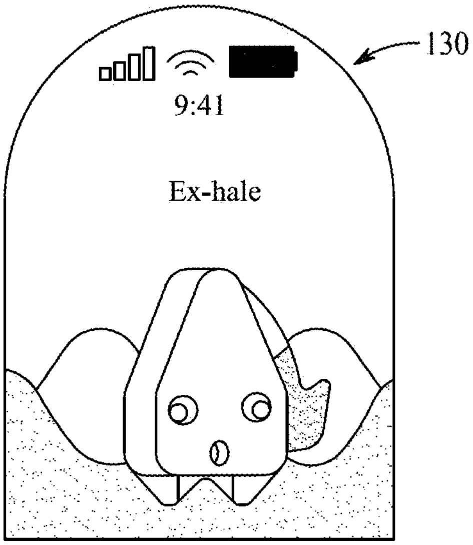
FIG. 6B depicts an exemplary second interface of implementation of the avatar program for executing mode modifying breathing exercises guiding a child to exhale, according to certain embodiments.

Referring to FIG. 6A and FIG. 6B, illustrated are exemplary interfaces of the implementation of the avatar program for executing the mood modifying video game on the display module 130 of the smartwatch 100. FIG. 6A depicts the first interface of the mood modifying video game, specifically designed to help the child manage feelings of anger or stress through a guided breathing exercise. The display module 130 shows the avatar, with the word "inhale" being displayed to guide the child to inhale as part of the breathing exercise. FIG. 6B illustrates the second interface of the same mood modifying video game, representing the exhale phase of the breathing exercise. In this interface, the text at the top of the screen now reads "ex-hale," prompting the child to exhale. The microprocessor 148 is programmed to alternate between these two interfaces in a rhythmic pattern, guiding the child through a series of deep breaths. This implementation of the avatar program serves as an interactive, visually-aided breathing exercise, specifically tailored to help reduce anger or stress levels of the child.

Figure 7A:
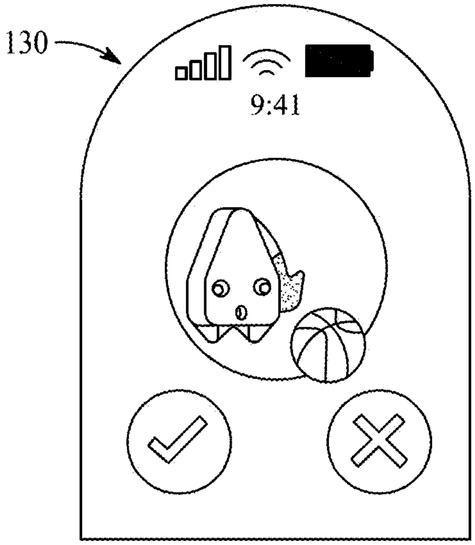
FIG. 7A depicts an exemplary first interface of implementation of the avatar program for executing an activity video game, according to certain embodiments.
Figure 7B:
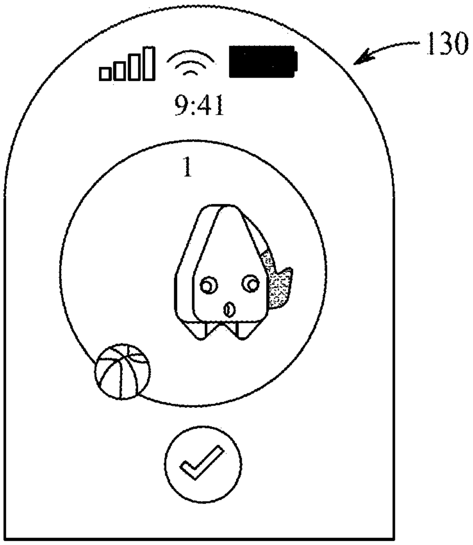
FIG. 7B depicts an exemplary second interface of implementation of the avatar program for executing the activity video game, according to certain embodiments.

Referring to FIG. 7A and FIG. 7B, illustrated are exemplary interfaces of the implementation of the avatar program for executing the activity video game on the display module 130 of the smartwatch 100. FIG. 7A depicts the first interface of the activity video game, designed to encourage physical movement in the child. The display module 130 shows the avatar holding a basketball, prompting the child to engage in some physical activity. FIG. 7B illustrates the second interface of the same activity video game, representing a progression after the child successfully engages in a physical activity. The microprocessor 148 is programmed to track movement of the child using the gyroscopic accelerometer 156 and update the interface based on their activity, providing real-time feedback and encouragement to promote continued movement. This implementation of the avatar program serves as an interactive and engaging way to motivate the child to be physically active.

Referring to FIG. 8, the present disclosure further provides a smartwatch communication system 800 for facilitating communication between the parent and the child. The smartwatch communication system 800 incorporates the smartwatch 100 as described in the preceding paragraphs, along with additional components to enable such communication and monitoring. In particular, the smartwatch communication system 800 includes the smartwatch 100 including the photoplethysmography (PPG) sensor 152 and the electrodermal activity (EDA) sensor 154 configured to make PPG measurements and EDA measurements respectively on the wrist of the child. Herein, the PPG measurements include blood oxygenation level and the pulse rate of the child and the EDA measurements include the electrical conductivity of the wrist of the child. The smartwatch communication system 800 further includes the gyroscopic accelerometer 156 located within the smartwatch 100. The gyroscopic accelerometer 156 is configured to measure changes in an orientation and a rotation of the smartwatch 100. The smartwatch communication system 800 further includes the touch screen display 129 located on the front face (the screen side 104) of the smartwatch 100. The smartwatch communication system 800 further includes the near field communications unit 144 located within the smartwatch 100. The smartwatch communication system 800 further includes the global positioning receiver 158 located within the smartwatch 100. The smartwatch communication system 800 further includes the microprocessor

148 operatively connected to the touch screen display 129, the near field communications unit 144, the global positioning receiver 158, the PPG sensor 152, the EDA sensor 154 and the gyroscopic accelerometer 156. The microprocessor 148 is configured with electrical circuitry, the smartwatch memory including program instructions and the measurement database configured with data linking moods of the child to PPG and EDA measurements and data linking activity levels to the changes in orientation and rotation of the smartwatch 100, and the at least one processor.

The at least one processor of the microprocessor 148 is configured to execute the program instructions stored in the smartwatch memory to perform various functions within the smartwatch communication system 800. The processor receives the blood oxygenation level and pulse rate of the child from the PPG sensor 152 through the wiring harness 150. The processor also receives the electrical conductivity of the wrist of the child from the EDA sensor 154 through the wiring harness 150. The processor then accesses the measurement database stored in the memory to match the received PPG and EDA measurements to a corresponding mood of the child. This matching process involves comparing the measurements with the data stored in the database, which links specific combinations of PPG and EDA values to different moods. Additionally, the processor accesses the measurement database to match the changes in orientation and rotation of the smartwatch 100, as measured by the gyroscopic accelerometer 156, to an activity level of the child. The measurement database contains data that correlates specific patterns of orientation and rotation changes with different activity levels, such as light activity, moderate activity, or heavy activity. By comparing the received data with the stored data, the processor can determine current activity level of the child. Furthermore, the processor receives the location of the smartwatch 100 from the global positioning receiver 158. This location information is typically obtained through GPS technology, which utilizes signals from satellites to triangulate the position of the smartwatch 100. The processor then uses this location information, along with the previously determined mood and activity level, to generate the mood-modifying message and the activity level message. These messages are designed to provide feedback or suggestions to the child based on their current emotional and physical state. The processor then sends commands to the touch screen display 129 to display the mood-modifying message and the activity level message. These messages may be presented in various formats, such as text, icons, or graphical representations, and are intended to be easily understood by the child. Finally, the processor generates a communication packet that includes the mood, activity level, and location of the child.

Herein, the microprocessor 148 is configured to command the NFC unit 144 to transmit the communication packet to a smartphone (as represented by numeral 802 in FIG. 8) belonging to the parent. That is, the microprocessor 148, after generating the communication packet containing the mood, activity level, and location of the child, sends a command to the NFC unit 144. This command instructs the NFC unit 144 to initiate a wireless communication session with the smartphone 802 (in proximity) belonging to the parent or guardian. The NFC unit 144 then transmits the communication packet to the smartphone 802 using NFC technology, which enables short-range wireless data transfer between compatible devices. The NFC unit 144 is configured to be wirelessly connected with the smartphone 802 through a near field communications channel. The transmission of the communication packet allows the parent or guardian to receive real-time updates on the well-being and location of the child through a corresponding application on the smartphone 802.

In an aspect of the present disclosure, the smartwatch communication system 800 further includes a wireless router 804 located within connection proximity to the smartwatch 100. In this configuration, the NFC unit 144 of the smartwatch 100 is configured to transmit the communication packet, containing the mood, activity level, and location of the child, to the wireless router 804 instead of directly to the smartphone 802 of the parents. The wireless router 804 acts as an intermediary, receiving the communication packet from the smartwatch 100 via NFC and then transmitting it over a wireless network, such as Wi-Fi, to the smartphone 802 belonging to the parent. This configuration allows for greater flexibility and range in communication, as the smartwatch 100 does not need to be in close proximity to the smartphone 802 to transmit the data. In alternate configurations, the microprocessor 148 may use other communication channels, such as near field, WiFi, wireless or cellular data for such transmission, without departing from the spirit and the scope of the present disclosure.

Figure 9:
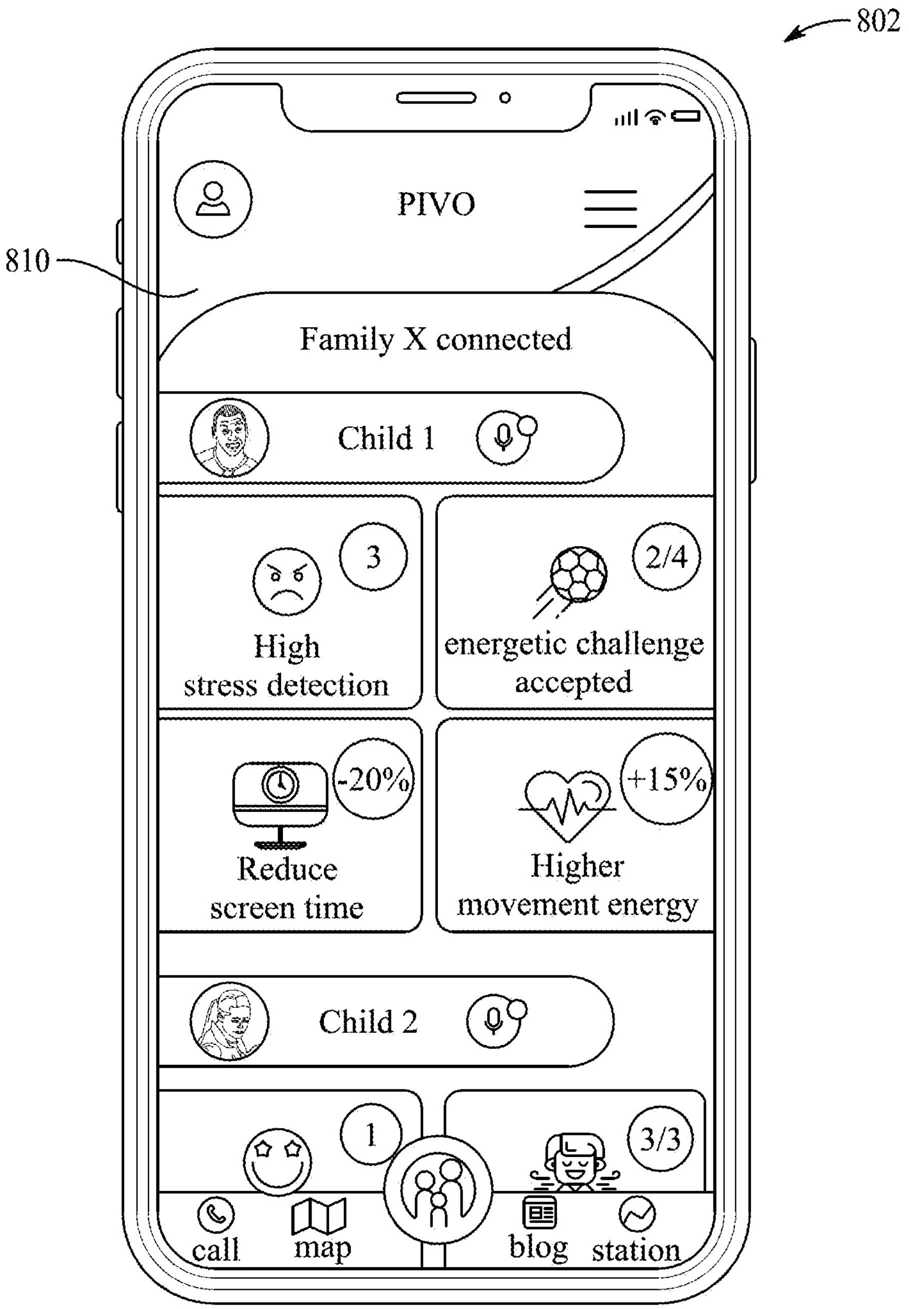
FIG. 9 is an exemplary interface of a positive parenting computer application in a smartphone, according to certain embodiments.

In the smartwatch communication system 800, the smartphone 802 includes a near-field communication (NFC) receiver 806 and a wireless receiver 808. The NFC receiver 806 is configured to receive the communication packet directly from the smartwatch 100 over a short range, while the wireless receiver 808 is configured to receive the communication packet over a wireless network, such as Wi-Fi, when the smartwatch 100 is connected to the wireless router 804. Such configuration ensures that the smartphone 802 can receive the communication packet from the smartwatch 100 regardless of the available connectivity options. The smartphone 802 also includes a smartphone memory (not shown) that stores a positive parenting computer application. This positive parenting computer application is specifically designed to facilitate communication and monitoring between parents and children. The smartwatch 100 is registered with the positive parenting computer application, establishing a secure connection between the two devices. FIG. 9 illustrates an exemplary interface of the positive parenting (PIVO) computer application in the smartphone 802. The positive parenting computer application is configured to display various types of information on a display screen 810 of the smartphone 802. This information includes the location of the child, which is obtained from the global positioning receiver 158 in the smartwatch 100. The positive parenting computer may also display a photograph of the child, allowing the parent to visually identify them. Furthermore, the positive parenting computer application displays the mood and activity level of the child, which are determined by the smartwatch 100 based on the PPG and EDA measurements, as well as the data from the gyroscopic accelerometer 156. The positive parenting computer may also display incoming calls or messages from the child, enabling the parent to communicate with them directly through the smartwatch 100. Additionally, the positive parenting computer application provides parent resource links based on the mood and activity level of the child. These links may direct the parent to relevant articles, videos, or other resources that can help them understand and address the emotional and physical needs of the child.

In an aspect of the present disclosure, the smartwatch communication system 800 further includes a video game database (not shown) stored within the memory of the smartwatch 100. The video game database contains a variety of mood-modifying video games and activity video games.

As discussed, the mood-modifying video games are designed to help children regulate their emotions and improve their mood through engaging gameplay and interactive elements. The activity video games, on the other hand, are designed to encourage physical movement and exercise. The smartwatch 100 also includes the avatar program stored within its memory. The at least one processor of the microprocessor 148 is configured to execute the program instructions stored in the smartwatch memory to access either the mood-modifying video game or the activity video game based on the current mood or activity level of the child, respectively. The mood and activity level are determined by the smartwatch 100 as described previously. Once the appropriate video game is selected, the processor displays the avatar on the touch screen display 129 along with instructions for the child to click on the avatar to start playing the game. This interactive feature aims to engage the child and provide a fun way to manage his/her emotions or increase his/her physical activity.

In an aspect of the smartwatch communication system 800, the microprocessor 148 is programmed to monitor the activity levels in time intervals of about 30 minutes. If the microprocessor 148 detects that the activity level of the child has not changed within a given 30-minute interval, indicating a period of inactivity, the microprocessor 148 triggers the display of the avatar on the touch screen display 129. The avatar may appear with a message or animation prompting the child to engage in physical activity. This feature serves as a reminder for the child to move and be active, promoting a healthy lifestyle and preventing prolonged periods of inactive behavior.

Figure 10:
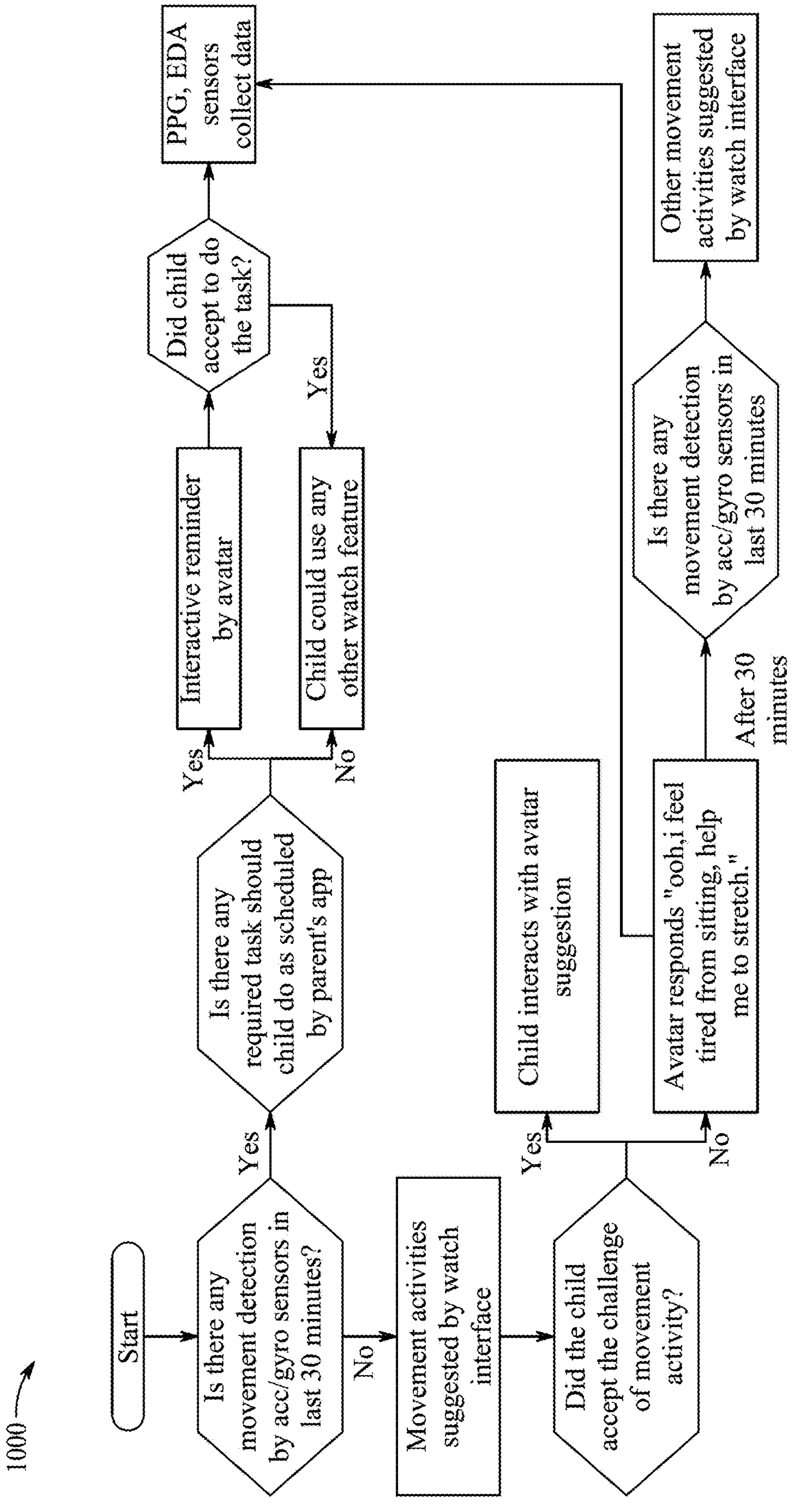
FIG. 10 is an exemplary schematic flowchart of the smartwatch being implemented as the smartwatch communication system to monitor activity levels of the user and to play an activity video game, according to certain embodiments.

Referring to FIG. 10, illustrated is a flowchart of a process 1000 depicting the operation of the smartwatch 100, particularly focusing on its movement detection and task management features. The process 1000 illustrates the interaction of the smartwatch 100 with the child to encourage physical activity and manage tasks scheduled by parents. The process 1000 begins at the “Start” node. The first decision point determines if there any movement detection in last 30 minutes. This utilizes the gyroscopic accelerometer 176 to monitor the physical activity of the child. If the answer is “Yes” (movement detected), the process 1000 proceeds to the next decision point to determine if there is any required task should child do, as scheduled by parents’app. This checks for any tasks set by parents through the positive parenting computer application. If there is a scheduled task (Yes), an “Interactive reminder by avatar” is triggered. The avatar program displays the avatar on the display module 130 to remind the child of the task. The process 1000 then moves to check if the child has accepted to do the task, checking for the response of the child to the reminder. If the child accepts the task (Yes), or if there was no scheduled task (No), the process 1000 proceeds to collect sensors data. This involves the PPG sensor 152 and EDA sensor 154 gathering physiological data to assess the emotional state of the child. If there is no movement detected earlier, the activity video game is triggered. Herein, the smartwatch 100 suggests physical activities to the child through the display module 130. The process 1000 then moves to check if the child has accept the challenge of movement activity, checking the response of the child to the suggestion. If the child accepts (Yes), some suggestions related to interact with the avatar are provided, where the child engages with the suggested activity presented by the avatar. If the child may not accept (No), the avatar responds with a motivating message to encourage the child to move by suggesting a simple activity. Further, after 30 minutes, the process 1000 determines if there is any movement detection in last 30 minutes, rechecking for physical activity. If no movement is detected (No), some other movement activities are suggested, offering alternative physical activities to the child. The process 1000 then loops back to the PPG and EDA data collection step, continuously monitoring the physiological state of the child. In the process 1000, if at any point the child may not accept a task, the child may be provided with options to use any other watch feature, allowing the child to interact with other functions of the smartwatch 100. This way the process 1000 continuously monitors activity levels of the child, provides timely reminders for scheduled tasks, encourages physical movement, and collects physiological data.

Figure 11:
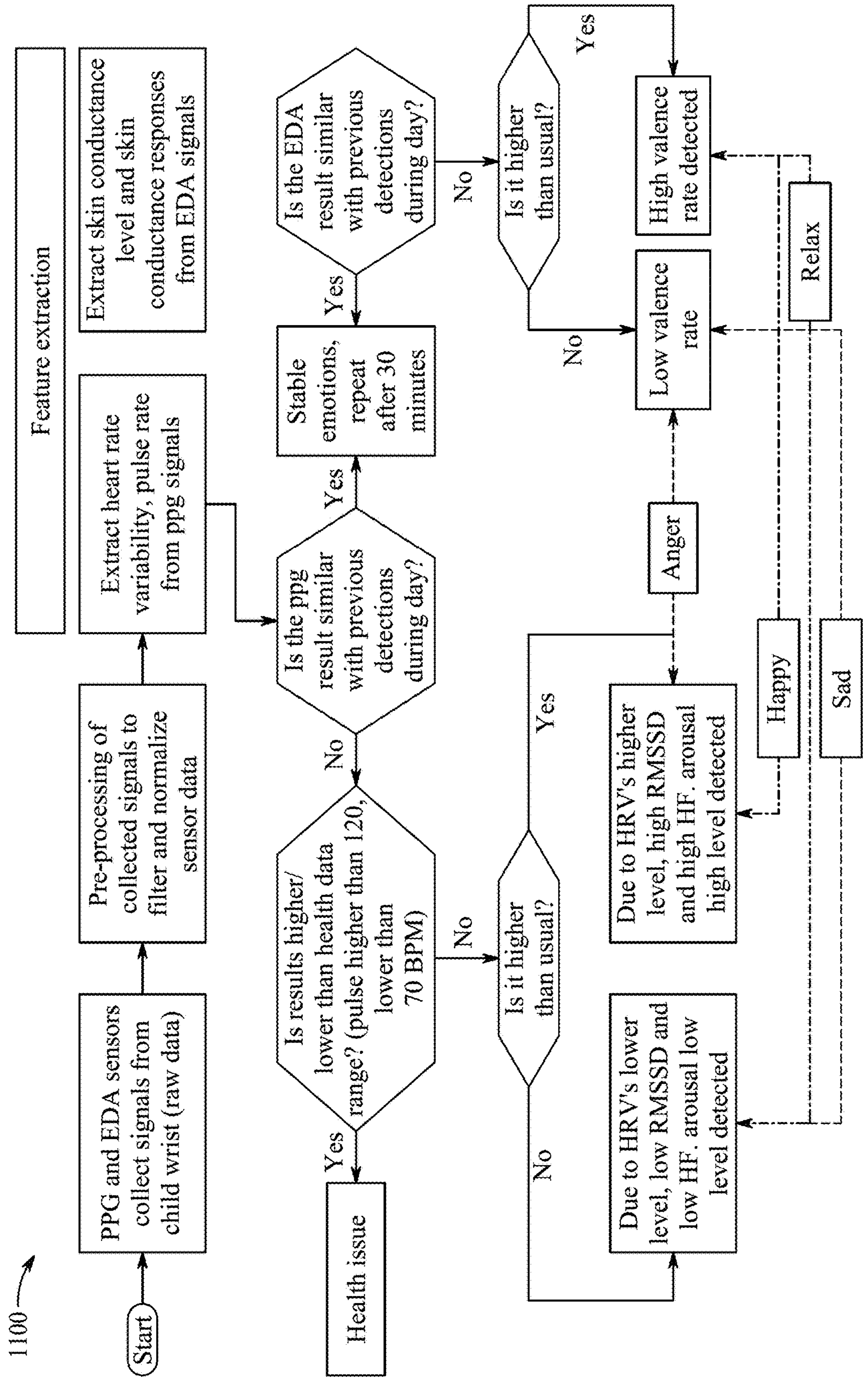
FIG. 11 is an exemplary schematic flowchart of the smartwatch being implemented as the smartwatch communication system to monitor emotions of the user, according to certain embodiments.

Referring to FIG. 11, illustrated is a flowchart of a process 1100 depicting the operation of the smartwatch 100, particularly focusing on its physiological data collection and emotional state detection features. The process 1100 begins at the “Start” node, where the PPG sensor 152 and EDA sensor 154 collect signals from the child’s wrist, gathering raw data. This raw data then undergoes pre-processing to filter and normalize the sensor data, ensuring accuracy and consistency in measurements. The process 1100 then moves to the feature extraction stage. Here, heart rate variability and pulse rate are extracted from the PPG signals, while skin conductance level and skin conductance responses are extracted from the EDA signals. These extracted features provide information about the physiological state of the child. Following feature extraction, the process 1100 enters a series of decision points. First, it checks if the results are higher or lower than the health data range, specifically if the pulse is higher than 120 or lower than 70 beats per minute (BPM). If Yes, a health issue is flagged, potentially alerting parents or caregivers. If No, the process 1100 continues to the next decision point. The next decision determines if the PPG result is similar to previous detections during the day. If No, the process 1100 checks if the current reading is higher than usual. If Yes, it indicates a state of high arousal, characterized by higher heart rate variability (HRV) levels, high root mean square of successive differences (RMSSD), and high high-frequency (HF) components. If No, it indicates a state of low arousal, with lower HRV levels, low RMSSD, and low HF components. If the PPG result is similar to previous detections (Yes), the process 1100 moves to check if the EDA result is similar to previous detections during the day. If Yes, it indicates stable emotions, and the process repeats after a while. If No, the process 1100 checks if the EDA reading is higher than usual. If the EDA reading is higher than usual (Yes), it indicates a high valence rate, associated with positive emotions. If No, it indicates a low valence rate, typically associated with negative emotions. The combination of arousal levels (from PPG data) and valence rates (from EDA data) helps in determining the emotional state of the child. The process 1100 then categorizes the emotional states into four main types: Happy (high arousal, high valence), Relax (low arousal, high valence), Sad (low arousal, low valence), and Anger (high arousal, low valence). This emotional state detection allows the smartwatch 100 to provide appropriate responses or interventions through the avatar program, and the mood modifying video game or the activity video game stored in the video game database.

Figure 12:
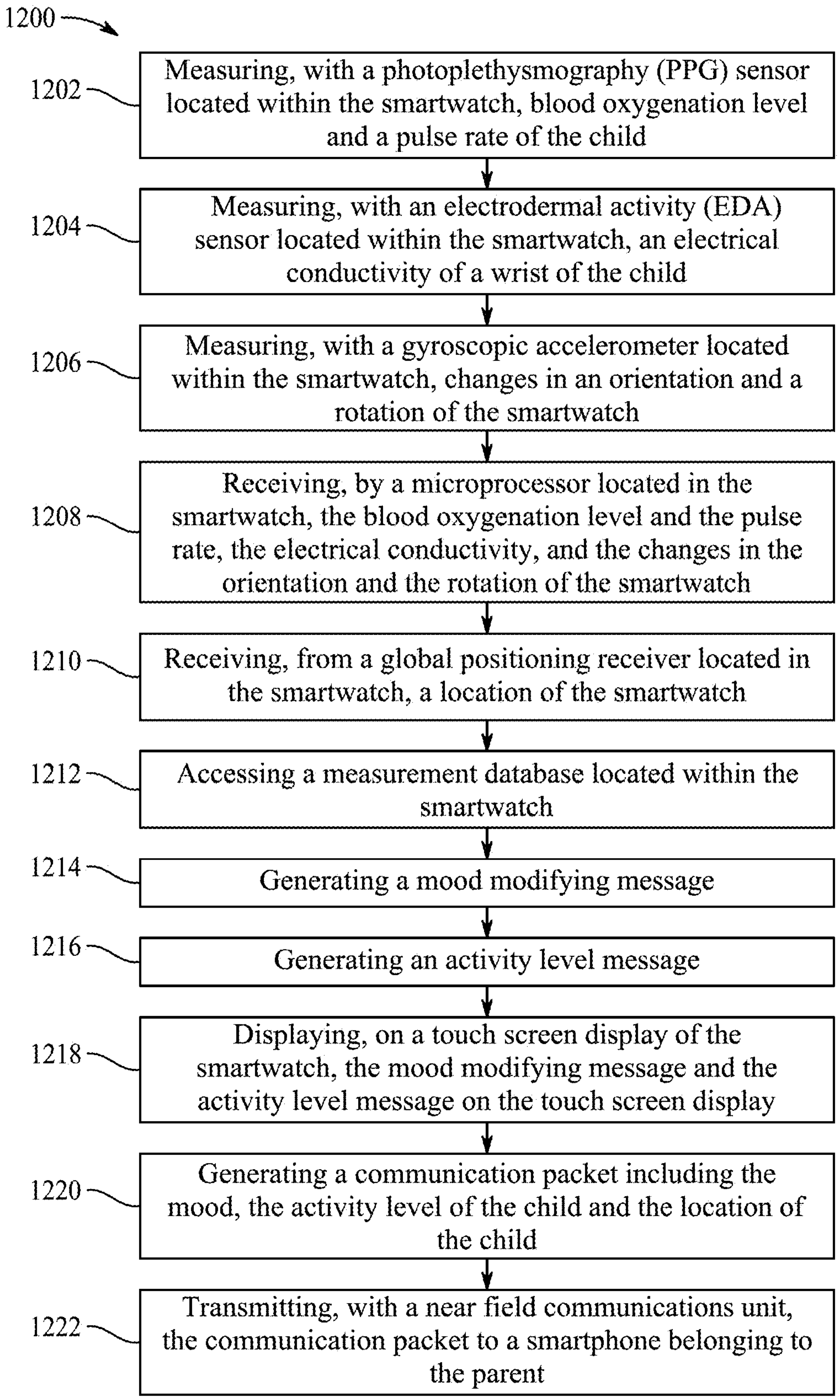
FIG. 12 is an exemplary flowchart of a method for smartwatch communication between a parent and a child, according to certain embodiments.

Referring now to FIG. 12, the present disclosure further provides a method (as represented by a flowchart, referred by reference numeral 1200) for smartwatch communication between a parent and a child. The method 1200 includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned smartwatch 100 and the smartwatch communication system 800 apply mutatis mutandis to the present method 1200.

At step 1202, the method 1200 involves measuring, with the PPG sensor 152 located within the smartwatch 100, blood oxygenation level and a pulse rate of the child. This step utilizes the PPG sensor 152, which emits light into the skin of the child and measures the reflected light to determine blood volume changes. The PPG sensor 152 analyzes these changes to calculate the blood oxygenation level of the child, indicating the amount of oxygen in their blood, and their pulse rate, providing a measure of heart activity. At step 1204, the method 1200 involves measuring, with the EDA sensor 154 located within the smartwatch 100, an electrical conductivity of a wrist of the child. The EDA sensor 154 applies a small, undetectable electrical current to the skin of the child and measures ability of the skin to conduct electricity. This measurement provides insight into the sympathetic nervous system activity of the child, which can indicate emotional arousal or stress levels. At step 1206, the method 1200 involves measuring, with the gyroscopic accelerometer 156 located within the smartwatch 100, changes in an orientation and a rotation of the smartwatch 100. The gyroscopic accelerometer 156 continuously monitors position and movement of the smartwatch 100 in three-dimensional space. This data is utilized for tracking physical activity levels of the child, detecting specific movements, and determining whether the child is active or sedentary.

At step 1208, the method 1200 involves receiving, by the microprocessor 148 located in the smartwatch 100, the blood oxygenation level and the pulse rate, the electrical conductivity, and the changes in the orientation and the rotation of the smartwatch 100. The microprocessor 148 acts as the central processing unit of the smartwatch 100, collecting and processing data from all sensors. The microprocessor 148 integrates this data to determine physiological state, emotional condition, and activity level of the child. At step 1210, the method 1200 involves receiving, from the global positioning receiver 158 located in the smartwatch 100, a location of the smartwatch 100. The global positioning receiver 158 utilizes satellite signals to determine the precise geographical location of the smartwatch 100. This information is utilized for tracking the whereabouts of the child, ensuring their safety, and providing location-based services or alerts to parents. Herein, the microprocessor 148 is configured with electrical circuitry, the smartwatch memory including program instructions and at least one processor configured to execute the program instructions.

At step 1212, the method 1200 involves accessing the measurement database located within the smartwatch 100. The measurement database is configured with data linking moods of the child to the blood oxygenation level and the pulse rate and with data linking activity levels to the changes in orientation and rotation of the smartwatch 100, to match the blood oxygenation level and the pulse rate to a mood of the child and to match the changes in orientation and rotation of the smartwatch 100 to an activity level of the child. This step utilizes the measurement database stored in the smartwatch memory to interpret the sensor data. The database contains pre-established correlations between physiological measurements and emotional states, as well as between movement patterns and activity levels. By comparing the current sensor readings to this database, the smartwatch 100 can infer the mood and activity level of the child.

At step 1214, the method 1200 involves generating the mood modifying message. Based on the mood determined in the previous step, the microprocessor 148 creates a message designed to positively influence the emotional state of the child. This may be a comforting message for a sad mood, a calming message for an anxious mood, or an encouraging message for a happy mood. The content of this message is tailored to be age-appropriate and engaging for the child. At step 1216, the method 1200 involves generating the activity level message. Similar to the mood modifying message, this message is created based on the activity level determined from the gyroscopic accelerometer data. If the child has been sedentary, the message may encourage movement. If the child has been very active, the message may praise their energy or suggest a calming activity. These messages are designed to promote a balanced lifestyle.

At step 1218, the method 1200 involves displaying, on the touch screen display 129 of the smartwatch 100, the mood modifying message and the activity level message. This step makes the generated messages visible to the child. The touch screen display 129 presents these messages in a visually appealing manner, including using colors, animations, or the avatar to make the information more engaging and understandable for the child. At step 1220, the method 1200 involves generating the communication packet including the mood, the activity level of the child and the location of the child. This step compiles the information determined by the smartwatch 100 into a standardized format for transmission. The communication packet includes details about current emotional state, physical activity level, and geographical location of the child. At step 1222, the method 1200 involves transmitting, with the NFC unit 144, the communication packet to the smartphone 802 belonging to the parent. This step sends the compiled information to the device of the parent. The NFC unit 144 establishes a secure, short-range wireless connection with the smartphone of the parent when in proximity, enabling the transfer of the communication packet. This allows parents to stay informed about well-being of their child, even when not physically present.

The present disclosure provides an approach to child monitoring and parent-child communication through the use of a smartwatch 100 equipped with multiple sensors and interactive features. Unlike prior art devices that may focus solely on location tracking or basic health monitoring, the smartwatch 100 of the present disclosure integrates the PPG sensor 152, the EDA sensor 154, and the gyroscopic accelerometer 176 to provide a detailed assessment of physiological, emotional, and activity states of the child. The combination of these sensors, coupled with the measurement database and data analysis performed by the microprocessor 148, allows for real-time mood detection and activity level assessment. Furthermore, the incorporation of the avatar program and the video game database introduces an interactive element that engages the child in mood-modifying and activity-promoting exercises.

The smartwatch 100 of the present disclosure provides parents with a more holistic view of well-being of their child, including emotional state and activity level. This comprehensive monitoring can alert parents to potential issues before they escalate. The interactive features of the smartwatch 100, particularly the avatar program and video games, offer immediate intervention and support for the child, promoting emotional regulation and physical activity in an engaging, age-appropriate manner. The NFC unit 144 ensures that parents receive regular updates through their smartphone 204, allowing for timely responses to their child's needs. Additionally, the ability of the smartwatch 100 to suggest activities and provide reminders for tasks scheduled by parents through the positive parenting computer application helps in developing sense of responsibility and time management skills in the child. Overall, the smartwatch 100 monitors and actively contributes to emotional and physical well-being of the child while facilitating the parent-child communication.

A first embodiment describes a smartwatch 100 for a child, comprising a U-shaped body 102 having a screen side 104, a base 106, a watch band extending edge 108, a watch band latching edge 110 opposite the watch band extending edge 108, a button edge 112 having a first aperture 114 for a first button 116 and a second aperture 118 for a second button 120, a communicator edge 122 opposite the button edge 112, the communicator edge 122 having a speaker aperture 124 and a microphone aperture 126; a touch screen 128 located on the screen side 104; a display module 130 located on the screen side 104 adjacent to the touch screen 128; a light module 132 located on the screen side 104 adjacent to the display module 130; a speaker 134 located within the U-shaped body 102 beneath the display module 130, wherein a sound generating end of the speaker 134 is configured to extend into the speaker aperture 124; a printed circuit board 138 located within the U-shaped body 102, wherein the printed circuit board 138 is configured to hold the speaker 134, a battery 140, a wireless charger 142, a near field communications unit 144, a signal booster 146, and a microprocessor 148 configured with electrical circuitry, a memory and at least one processor; a photoplethysmography (PPG) sensor 152 embedded in the base 106 beneath the printed circuit board 138; an electrodermal activity (EDA) sensor 154 embedded in the base 106 beneath the printed circuit board 138; and a watch band 101 connected to the watch band extending edge 108, wherein a length of the watch band 101 is configured to fit a wrist of a child.

In an aspect, the smartwatch 100 further comprises a wiring harness 150 located within the printed circuit board 138, wherein the wiring harness 150 is configured to connect the microprocessor 148 to the battery 140, the wireless charger 142, the near field communications unit 144, the signal booster 146, the memory, the speaker 134, the microphone 136, the display module 130, the light module 132, the touch screen 128, the PPG sensor 152 and the EDA sensor 154.

In an aspect, the smartwatch 100 further comprises a PPG measurement surface **152*a* located on a side of the PPG sensor 152, wherein the PPG measurement surface 152*a* is flush with an outside surface of the U-shaped body 102**.

In an aspect, the smartwatch 100 further comprises a plurality of high-intensity infrared light-emitting diodes **153*a* located within the PPG measurement surface 152*a* of the PPG sensor 152; and a plurality of photodiodes 153*b* located within the PPG measurement surface 152*a* of the PPG sensor 152, wherein the microprocessor 148 is configured to generate PPG measurement commands which actuate the plurality of high-intensity infrared light-emitting diodes 153*a* to generate an infrared light towards the wrist of the child, wherein the plurality of photodiodes 153*b* are configured to measure an infrared light reflected from the wrist of the child, determine a blood oxygenation level and a pulse rate of the child and transmit the blood oxygenation level and the pulse rate of the child through the wiring harness 150 to the microprocessor 148**.

In an aspect, the smartwatch 100 further comprises an EDA measurement surface **154*a* located on a side of the EDA sensor 154, wherein the EDA measurement surface 154*a* is flush with an outside surface of the U-shaped body 102**.

In an aspect, the smartwatch 100 further comprises a sense electrode **155*a* located within the EDA measurement surface 154*a* of the EDA sensor 154 at a first end; and a counter electrode 155*b* located within the EDA measurement surface 154*a* of the EDA sensor 154 at a second end separated from the first end by a distance less than a length of the EDA sensor 154, wherein the microprocessor 148 is configured to generate EDA measurement commands which actuate the sense electrode 155*a* to generate a current, wherein the EDA sensor 154 is configured to measure a voltage between the sense electrode 155*a* and the counter electrode 155*b*, determine an electrical conductivity of the wrist of the child and transmit the electrical conductivity through the wiring harness 150 to the microprocessor 148**.

In an aspect, the smartwatch 100 further comprises a measurement database located within the memory, wherein the measurement database is configured with data linking moods of the child to PPG and EDA measurements, wherein the microprocessor 148 is configured to receive the blood oxygenation level and pulse rate of the child from the PPG sensor 152, receive the electrical conductivity of the wrist of the child from the EDA sensor 154, access the measurement database to match the PPG measurements and the EDA measurements to a mood of the child, and generate a mood modifying message and a mood communication packet; wherein the display module 130 is configured to display the mood modifying message; and the near field communications unit 144 is configured to transmit the mood communication packet.

In an aspect, the smartwatch 100 further comprises a gyroscopic accelerometer 156 located on the printed circuit board 138 and connected to the microprocessor 148 through the wiring harness 150, wherein the gyroscopic accelerometer 156 is configured to measure changes in an orientation and a rotation of the smartwatch 100 and transmit the changes in the orientation and rotation through the wiring harness 150 to the microprocessor 148.

In an aspect, the smartwatch 100 further comprises data records located in the measurement database which link orientation and rotation of the smartwatch 100 to activity levels of the child, wherein the microprocessor 148 is configured to monitor the activity levels and generate an activity message related to the activity levels, wherein the display module 130 is configured to display the activity message; and the near field communications unit 144 is configured to transmit the activity levels and movement activity message in an activity communication packet.

In an aspect, the microprocessor 148 is configured to monitor the activity levels in time intervals of about 30 minutes and generate the movement activity message when the activity level of the child does not change within the time interval.

In an aspect, the smartwatch 100 further comprises a video game database located within the memory, wherein the video game database is configured to store mood modifying video games and activity video games; an avatar program stored within the memory; wherein the at least one processor is configured to execute the program instructions to one of access a mood modifying video game based on the mood of the child and display the avatar on the display module 130 with instructions to click on the avatar to play the mood modifying video game; and access an activity video game based on the activity level of the child and display the avatar on the display module 130 with instructions to click on the avatar to play the activity video game.

In an aspect, the smartwatch 100 further comprises a battery charger 200 having a charge end 200*a* configured to attach magnetically to the base 106 and a transformer end 200*b* configured to connect to a power source, wherein the battery charger 200 is configured to charge the battery 140 when the base 106 is attached to the charge end 200*a*.

In an aspect, the smartwatch 100 further comprises an ON/OFF button located in a first aperture 114, wherein the ON/OFF button is connected to the microprocessor 148 and is configured to one of turn ON the smartwatch 100 and turn OFF the smartwatch 100 when the ON/OFF button is depressed.

In an aspect, the smartwatch 100 further comprises a volume control button located in the second aperture 118, wherein the volume control button is connected to the speaker 134.

A second embodiment describes a smartwatch communication system 800 for facilitating communication between a parent and a child, comprising a smartwatch 100 including a photoplethysmography (PPG) sensor 152 and an electrodermal activity (EDA) sensor 154 configured to make PPG measurements and EDA measurements respectively on a wrist of the child, wherein the PPG measurements include blood oxygenation level and a pulse rate of the child and the EDA measurements include an electrical conductivity of the wrist of the child; a gyroscopic accelerometer 156 located within the smartwatch 100, wherein the gyroscopic accelerometer 156 is configured to measure changes in an orientation and a rotation of the smartwatch 100; a touch screen display 129 located on a front face of the smartwatch 100; a near field communications unit 144 located within the smartwatch 100; a global positioning receiver 158 located within the smartwatch 100; a microprocessor 148 operatively connected to the touch screen display 129, the near field communications unit 144, the global positioning receiver 158, the PPG sensor 152, the EDA sensor 154 and the gyroscopic accelerometer 156, wherein the microprocessor 148 is configured with electrical circuitry, a smartwatch memory including program instructions and a measurement database configured with data linking moods of the child to PPG and EDA measurements and data linking activity levels to the changes in orientation and rotation of the smartwatch 100, and at least one processor configured to execute the program instructions to receive the blood oxygenation level and pulse rate of the child from the PPG sensor 152; receive the electrical conductivity of the wrist of the child from the EDA sensor 154; access the measurement database to match the PPG measurements and the EDA measurements to a mood of the child; access the measurement database to match the changes in an orientation and a rotation of the smartwatch 100 to an activity level of the child; receive a location of the smartwatch 100 from the global positioning receiver 158; generate a mood modifying message; generate an activity level message; display the mood modifying message and the activity level message on the touch screen display 129; and generate a communication packet including the mood, the activity level of the child and the location of the child, wherein the microprocessor 148 is configured to command the near field communications unit 144 to transmit the communication packet to a smartphone 802 belonging to the parent.

In an aspect, the smartwatch communication system 800 further comprises a wireless router 804 located within connection proximity to the smartwatch 100, wherein the near field communications unit 144 is configured to transmit the communication packet to the wireless router 804, and the wireless router 804 is configured to transmit the communication packet over a wireless network to the smartphone 802 belonging to the parent.

In an aspect, the smartphone 802 comprises at least one of a near field receiver configured to receive the communication packet over a near field communications channel from the smartwatch 100 and a wireless receiver configured to receive the communication packet over the wireless network; and a smartphone memory configured to store a positive parenting computer application, wherein the smartwatch 100 is registered with the positive parenting computer application, wherein the positive parenting computer application is configured to display, on a display screen 810 of the smartphone 802, at least one of a location of the child, a photograph of the child, the mood of the child, the activity level of the child, an incoming call from the child, an incoming message from the child, and parent resource links based on one of the mood and the activity level of the child.

In an aspect, the smartwatch communication system 800 further comprises a video game database located within the smartwatch memory, wherein the video game database is configured to store mood modifying video games and activity video games; an avatar program stored within the smartwatch memory; wherein the at least one processor is configured to execute the program instructions to one of access a mood modifying video game based on the mood of the child and display the avatar on the touch screen display 129 with instructions to click on the avatar to play the mood modifying video game; and access an activity video game based on the activity level of the child and display the avatar on the touch screen display 129 with instructions to click on the avatar to play the activity video game.

In an aspect, the microprocessor 148 is configured to monitor the activity levels in time intervals of about 30 minutes and display the avatar on the touch screen display 129 when the activity level of the child does not change within the time interval.

A third embodiment describes a method 1200 for smartwatch communication between a parent and a child, comprising measuring, with a photoplethysmography (PPG) sensor 152 located within the smartwatch 100, blood oxygenation level and a pulse rate of the child; measuring, with an electrodermal activity (EDA) sensor 154 located within the smartwatch 100, an electrical conductivity of a wrist of the child; measuring, with a gyroscopic accelerometer 156 located within the smartwatch 100, changes in an orientation and a rotation of the smartwatch 100; receiving, by a microprocessor 148 located in the smartwatch 100, the blood oxygenation level and the pulse rate, the electrical conductivity, and the changes in the orientation and the rotation of the smartwatch 100; receiving, from a global positioning receiver 158 located in the smartwatch 100, a location of the smartwatch 100, wherein the microprocessor 148 is configured with electrical circuitry, a smartwatch memory including program instructions and at least one processor configured to execute the program instructions for accessing a measurement database located within the smartwatch 100, wherein the measurement database is configured with data linking moods of the child to the blood oxygenation level and the pulse rate and with data linking activity levels to the changes in orientation and rotation of the smartwatch 100, to match the blood oxygenation level and the pulse rate to a mood of the child and to match the changes in orientation and rotation of the smartwatch 100 to an activity level of the child; generating a mood modifying message; generating an activity level message; displaying, on a touch screen display 129 of the smartwatch 100, the mood modifying message and the activity level message; generating a communication packet including the mood, the activity level of the child and the location of the child; transmitting, with a near field communications unit 144, the communication packet to a smartphone belonging to the parent.

Figure 13:
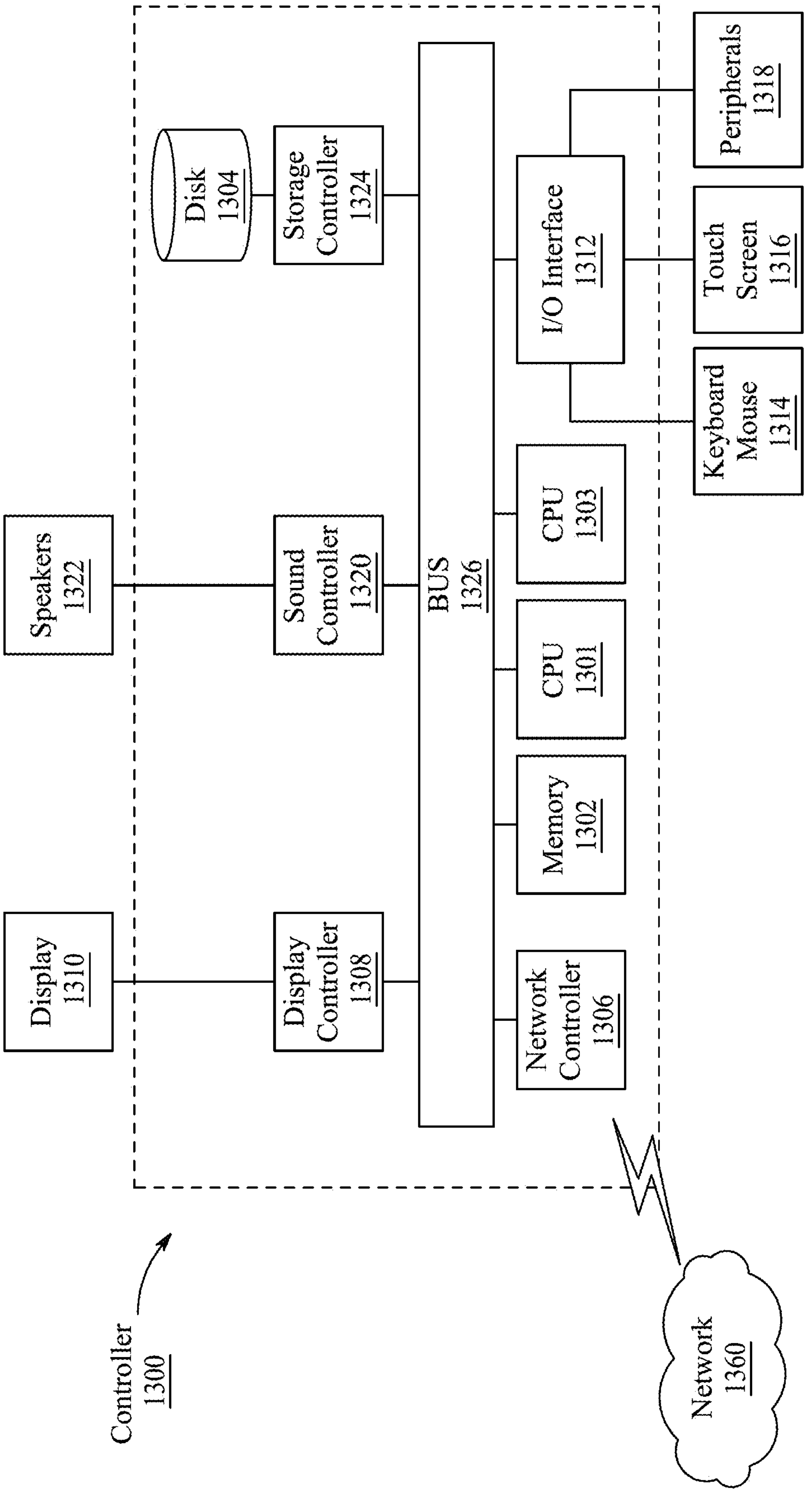
FIG. 13 is an illustration of a non-limiting example of details of computing hardware used in the computing system, according to certain embodiments.

Next, further details of the hardware description of the computing environment according to exemplary embodiments is described with reference to FIG. 13. In FIG. 13, a controller 1300 is described which embodies the microprocessor 148. The controller 1300 is a computing device which includes a CPU 1301 which performs the processes described above/below. The process data and instructions may be stored in memory 1302. These processes and instructions may also be stored on a storage medium disk 1304 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1301, 1303 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of ordinary skill in the art would recognize. Further, CPU 1301, 1303 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G, 13G and 14G wireless cellular systems. The wireless network can also be WiFi, Bluetooth, or any other wireless form of communication that is known.

The computing device further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the computing device such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
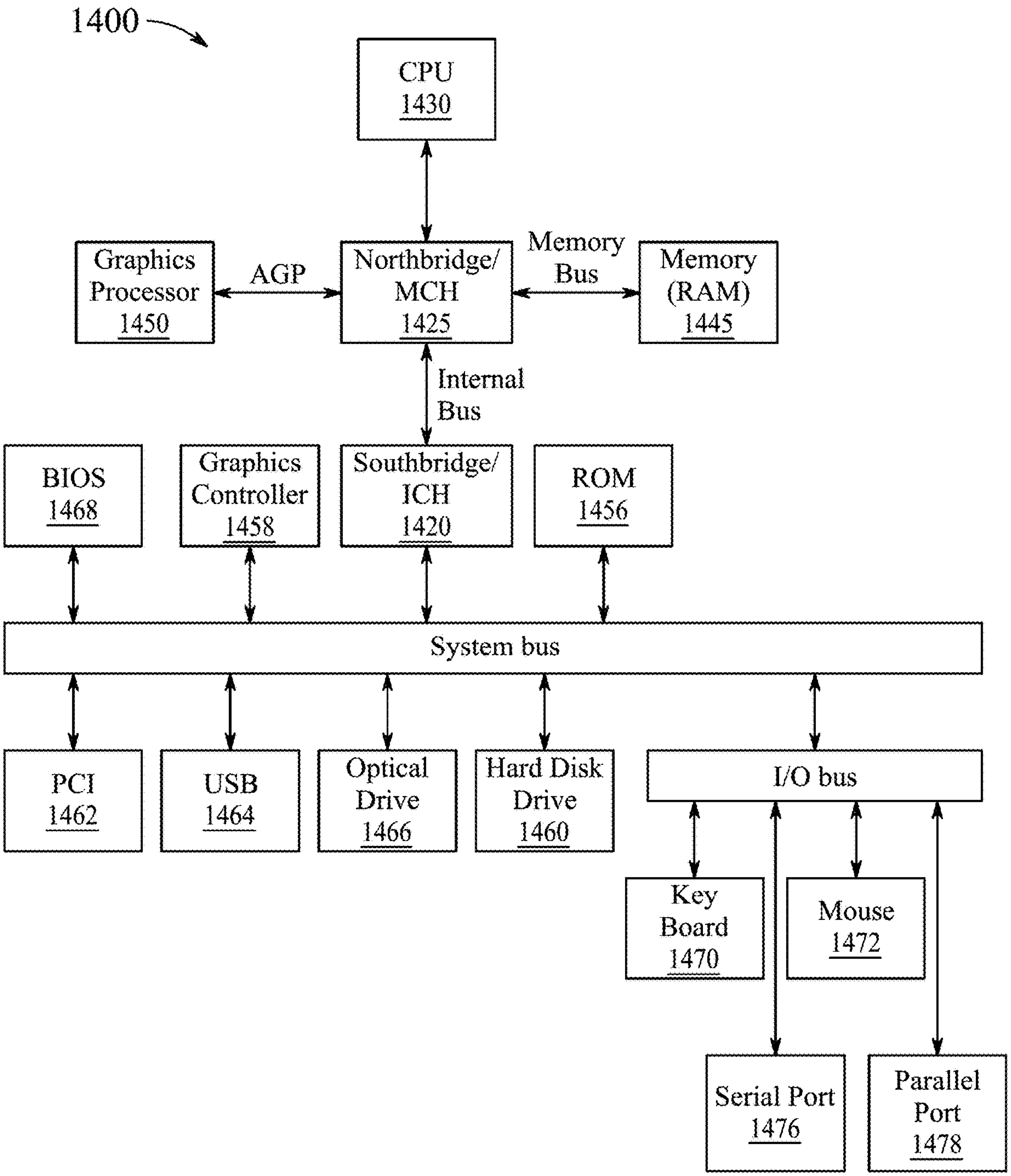
FIG. 14 is an exemplary schematic diagram of a data processing system used within the computing system, according to certain embodiments.

FIG. 14 shows a schematic diagram of a data processing system, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may contain one or more processors and even may be implemented using one or more heterogeneous processor systems.

Figure 15:
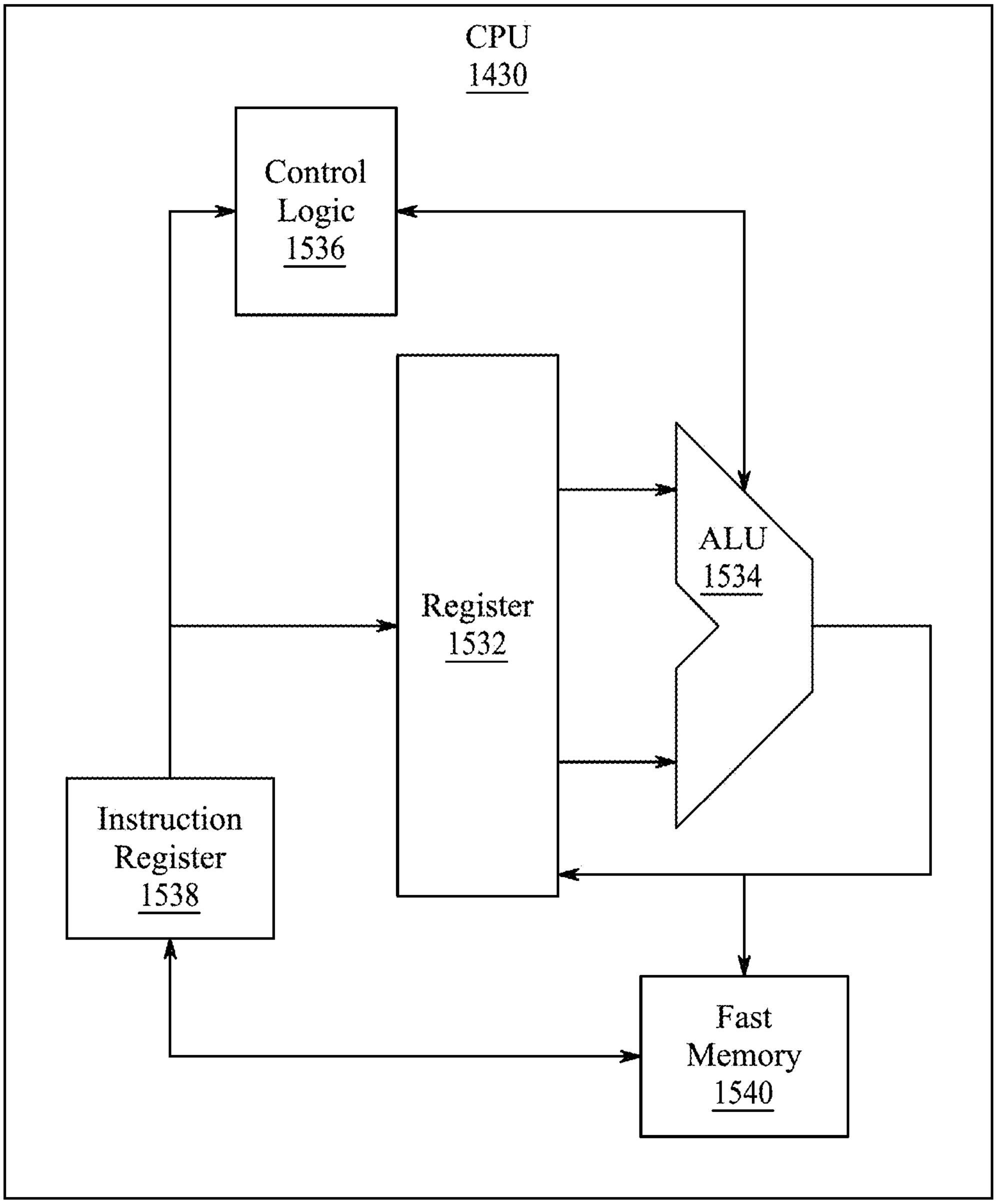
FIG. 15 is an exemplary schematic diagram of a processor used with the computing system, according to certain embodiments.

For example, FIG. 15 shows one implementation of CPU 1430. In one implementation, the instruction register 1538 retrieves instructions from the fast memory 1540. At least part of these instructions are fetched from the instruction register 1538 by the control logic 1536 and interpreted according to the instruction set architecture of the CPU 1430. Part of the instructions can also be directed to the register 1532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540. According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1488 through a PCI bus 1462.

The PCI devices may include, for example, Ethernet adapters, add-in cards, and PC cards for notebook computers. The Hard disk drive 1460 and CD-ROM 1466 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1420 through a system bus. In one implementation, a keyboard 1470, a mouse 1472, a parallel port 1478, and a serial port 1476 can be connected to the system bus through the I/O bus. Other peripherals and devices that can be connected to the SB/ICH 1420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 16:
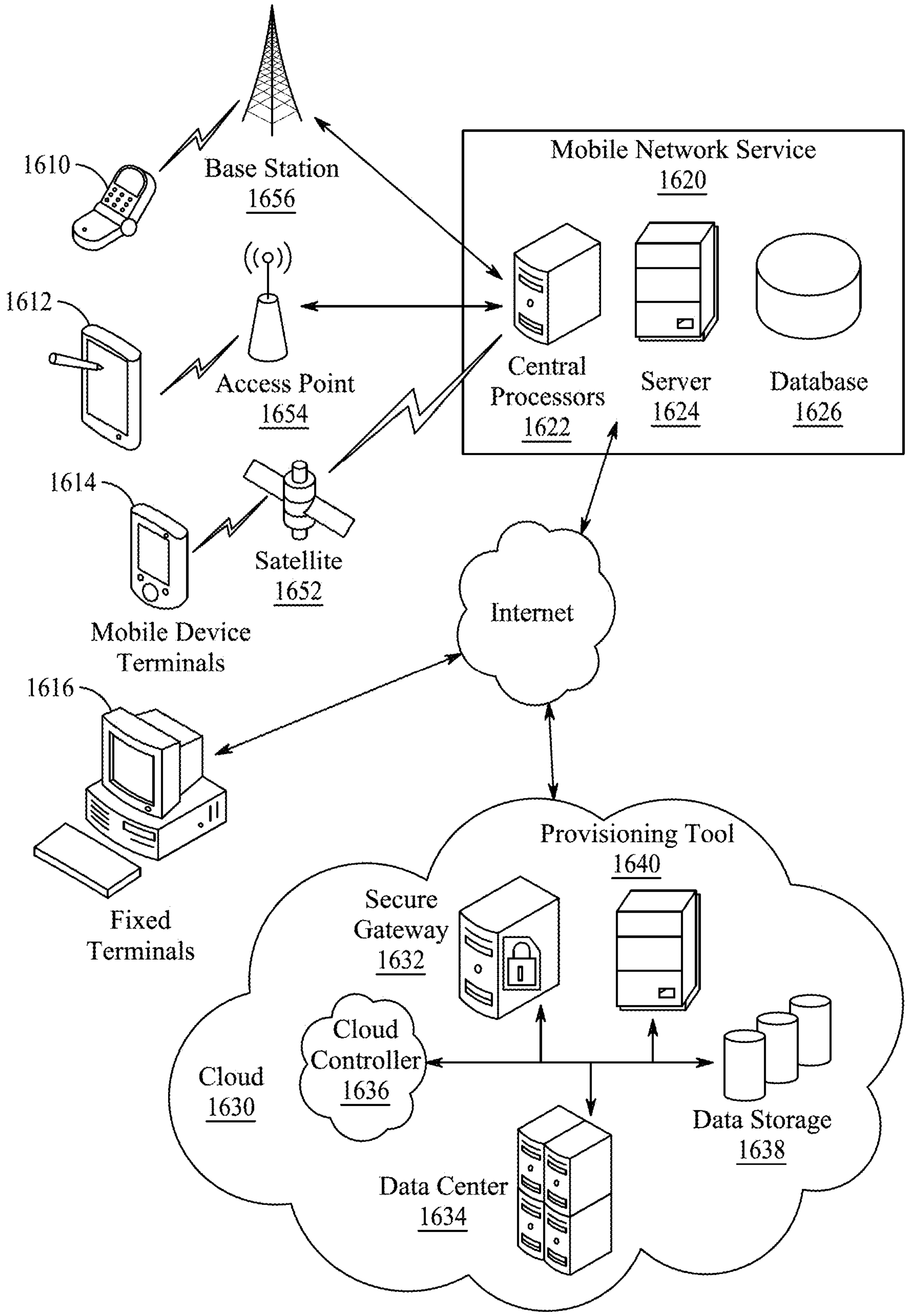
FIG. 16 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A smartwatch for a child, comprising:

a U-shaped body having a screen side, a base, a watch band extending edge, a watch band latching edge opposite the watch band extending edge, a button edge having a first aperture for a first button and a second aperture for a second button, a communicator edge opposite the button edge, the communicator edge having a speaker aperture and a microphone aperture;

a touch screen located on the screen side;

a display module located on the screen side adjacent to the touch screen;

a light module located on the screen side adjacent to the display module;

a speaker located within the U-shaped body beneath the display module, wherein a sound generating end of the speaker is configured to extend into the speaker aperture;

a printed circuit board located within the U-shaped body, wherein the printed circuit board is configured to hold the speaker, a battery, a wireless charger, a near field communications unit, a signal booster, and a microprocessor configured with electrical circuitry, a memory and at least one processor;

a photoplethysmography (PPG) sensor embedded in the base beneath the printed circuit board;

an electrodermal activity (EDA) sensor embedded in the base beneath the printed circuit board; and a watch band connected to the watch band extending edge, wherein a length of the watch band is configured to fit a wrist of a child.

2. The smartwatch of claim 1, further comprising:

a wiring harness located within the printed circuit board, wherein the wiring harness is configured to connect the microprocessor to the battery, the wireless charger, the near field communications unit, the signal booster, the memory, the speaker, the microphone, the display module, the light module, the touch screen, the PPG sensor and the EDA sensor.

3. The smartwatch of claim 2, further comprising:

a PPG measurement surface located on a side of the PPG sensor, wherein the PPG measurement surface is flush with an outside surface of the U-shaped body.

4. The smartwatch of claim 3, further comprising:

a plurality of high-intensity infrared light-emitting diodes located within the PPG measurement surface of the PPG sensor; and a plurality of photodiodes located within the PPG measurement surface of the PPG sensor, wherein the microprocessor is configured to generate PPG measurement commands which actuate the plurality of high-intensity infrared light-emitting diodes to generate an infrared light towards the wrist of the child, and wherein the plurality of photodiodes are configured to measure an infrared light reflected from the wrist of the child, determine a blood oxygenation level and a pulse rate of the child and transmit the blood oxygenation level and the pulse rate of the child through the wiring harness to the microprocessor.

5. The smartwatch of claim 4, further comprising:

an EDA measurement surface located on a side of the EDA sensor, wherein the EDA measurement surface is flush with an outside surface of the U-shaped body.

6. The smartwatch of claim 5, further comprising:

a sense electrode located within the EDA measurement surface of the EDA sensor at a first end; and a counter electrode located within the EDA measurement surface of the EDA sensor at a second end separated from the first end by a distance less than a length of the EDA sensor, wherein the microprocessor is configured to generate EDA measurement commands which actuate the sense electrode to generate a current, and wherein the EDA sensor is configured to measure a voltage between the sense electrode and the counter electrode, determine an electrical conductivity of the wrist of the child and transmit the electrical conductivity through the wiring harness to the microprocessor.

7. The smartwatch of claim 6, further comprising:

a measurement database located within the memory, wherein the measurement database is configured with data linking moods of the child to PPG and EDA measurements, wherein the microprocessor is configured to receive the blood oxygenation level and pulse rate of the child from the PPG sensor, receive the electrical conductivity of the wrist of the child from the EDA sensor, access the measurement database to match the PPG measurements and the EDA measurements to a mood of the child, and generate a mood modifying message and a mood communication packet;

wherein the display module is configured to display the mood modifying message; and the near field communications unit is configured to transmit the mood communication packet.

8. The smartwatch of claim 7, further comprising:

a gyroscopic accelerometer located on the printed circuit board and connected to the microprocessor through the wiring harness, wherein the gyroscopic accelerometer is configured to measure changes in an orientation and a rotation of the smartwatch and transmit the changes in the orientation and rotation through the wiring harness to the microprocessor.

9. The smartwatch of claim 8, further comprising:

data records located in the measurement database which link orientation and rotation of the smartwatch to activity levels of the child, wherein the microprocessor is configured to monitor the activity levels and generate an activity message related to the activity levels, wherein the display module is configured to display the activity message; and the near field communications unit is configured to transmit the activity levels and movement activity message in an activity communication packet.

10. The smartwatch of claim 9, wherein the microprocessor is configured to monitor the activity levels in time intervals of about 30 minutes and generate the movement activity message when the activity level of the child does not change within the time interval.

11. The smartwatch of claim 10, further comprising:

a video game database located within the memory, wherein the video game database is configured to store mood modifying video games and activity video games;

an avatar program stored within the memory;

wherein the at least one processor is configured to execute the program instructions to one of:

access a mood modifying video game based on the mood of the child and display the avatar on the display module with instructions to click on the avatar to play the mood modifying video game; and access an activity video game based on the activity level of the child and display the avatar on the display module with instructions to click on the avatar to play the activity video game.

12. The smartwatch of claim 1, further comprising:

a battery charger having a charge end configured to attach magnetically to the base and a transformer end configured to connect to a power source, wherein the battery charger is configured to charge the battery when the base is attached to the charge end.

13. The smartwatch of claim 1, further comprising:

an ON/OFF button located in a first aperture, wherein the ON/OFF button is connected to the microprocessor and is configured to one of turn ON the smartwatch and turn OFF the smartwatch when the ON/OFF button is depressed.

14. The smartwatch of claim 1, further comprising:

a plurality of pillars located with the watch band at spaced locations, wherein each pillar includes a haptic engine;

a plurality of wires embedded within the watch band, wherein the plurality of wires are configured to connect each haptic engine to the microprocessor, wherein the microprocessor is configured to generate drive signals to selectively activate each haptic engine located within the watch band.

15. A smartwatch communication system for facilitating communication between a parent and a child, comprising:

a smartwatch including a photoplethysmography (PPG) sensor and an electrodermal activity (EDA) sensor configured to make PPG measurements and EDA measurements respectively on a wrist of the child, wherein the PPG measurements include blood oxygenation level and a pulse rate of the child and the EDA measurements include an electrical conductivity of the wrist of the child;

a gyroscopic accelerometer located within the smartwatch, wherein the gyroscopic accelerometer is configured to measure changes in an orientation and a rotation of the smartwatch;

a touch screen display located on a front face of the smartwatch;

a near field communications unit located within the smartwatch;

a global positioning receiver located within the smartwatch;

a microprocessor operatively connected to the touch screen display, the near field communications unit, the global positioning receiver, the PPG sensor, the EDA sensor and the gyroscopic accelerometer, wherein the microprocessor is configured with electrical circuitry, a smartwatch memory including program instructions and a measurement database configured with data linking moods of the child to PPG and EDA measurements and data linking activity levels to the changes in orientation and rotation of the smartwatch, and at least one processor configured to execute the program instructions to:

receive the blood oxygenation level and pulse rate of the child from the PPG sensor; receive the electrical conductivity of the wrist of the child from the EDA sensor;

access the measurement database to match the PPG measurements and the EDA measurements to a mood of the child;

access the measurement database to match the changes in an orientation and a rotation of the smartwatch to an activity level of the child;

receive a location of the smartwatch from the global positioning receiver;

generate a mood modifying message;

generate an activity level message;

display the mood modifying message and the activity level message on the touch screen display; and generate a communication packet including the mood, the activity level of the child and the location of the child, wherein the microprocessor is configured to command the near field communications unit to transmit the communication packet to a smartphone belonging to the parent.

16. The smartwatch communication system of claim 15, further comprising:

a wireless router located within connection proximity to the smartwatch, wherein the near field communications unit is configured to transmit the communication packet to the wireless router, and the wireless router is configured to transmit the communication packet over a wireless network to the smartphone belonging to the parent.

17. The smartwatch communication system of claim 16, wherein the smartphone comprises:

at least one of a near field receiver configured to receive the communication packet over a near field communications channel from the smartwatch and a wireless receiver configured to receive the communication packet over the wireless network; and a smartphone memory configured to store a positive parenting computer application, wherein the smartwatch is registered with the positive parenting computer application, wherein the positive parenting computer application is configured to display, on a display screen of the smartphone, at least one of a location of the child, a photograph of the child, the mood of the child, the activity level of the child, an incoming call from the child, an incoming message from the child, and parent resource links based on one of the mood and the activity level of the child.

18. The smartwatch communication system of claim 15, further comprising:

a video game database located within the smartwatch memory, wherein the video game database is configured to store mood modifying video games and activity video games;

an avatar program stored within the smartwatch memory;

wherein the at least one processor is configured to execute the program instructions to one of:

access a mood modifying video game based on the mood of the child and display the avatar on the touch screen display with instructions to click on the avatar to play the mood modifying video game; and access an activity video game based on the activity level of the child and display the avatar on the touch screen display with instructions to click on the avatar to play the activity video game.

19. The smartwatch of claim 15, wherein the microprocessor is configured to monitor the activity levels in time intervals of about 30 minutes and one of display the avatar on the touch screen display and activate one or more haptic engines located within the watch band to vibrate when the activity level of the child does not change within the time interval.

20. A method for smartwatch communication between a parent and a child, comprising:

measuring, with a photoplethysmography (PPG) sensor located within the smartwatch, a blood oxygenation level and a pulse rate of the child;

measuring, with an electrodermal activity (EDA) sensor located within the smartwatch, an electrical conductivity of a wrist of the child;

measuring, with a gyroscopic accelerometer located within the smartwatch, changes in an orientation and a rotation of the smartwatch;

receiving, by a microprocessor located in the smartwatch, the blood oxygenation level and the pulse rate, the electrical conductivity, and the changes in the orientation and the rotation of the smartwatch;

receiving, from a global positioning receiver located in the smartwatch, a location of the smartwatch, wherein the microprocessor is configured with electrical circuitry, a smartwatch memory including program instructions and at least one processor configured to execute the program instructions for:

accessing a measurement database located within the smartwatch, wherein the measurement database is configured with data linking moods of the child to the blood oxygenation level and the pulse rate and with data linking activity levels to the changes in orientation and rotation of the smartwatch, to match the blood oxygenation level and the pulse rate to a mood of the child and to match the changes in orientation and rotation of the smartwatch to an activity level of the child;

generating a mood modifying message;

generating an activity level message;

displaying, on a touch screen display of the smartwatch, the mood modifying message and the activity level message;

generating a communication packet including the mood, the activity level of the child and the location of the child; and transmitting, with a near field communications unit, the communication packet to a smartphone belonging to the parent.

* * * * *